US009387391B2

(12) United States Patent
Hohmann et al.

(10) Patent No.: US 9,387,391 B2
(45) Date of Patent: Jul. 12, 2016

(54) SYSTEMS AND METHODS FOR SCORING FAMILIARITY

(75) Inventors: Luke H. Hohmann, Sunnyvale, CA (US); Daniel J. O'Leary, Mountain View, CA (US); Santiago Zavala de la Vega, Mountain View, CA (US); Tamara S. Carter, San Francisco, CA (US); Wako Takayama, Palo Alto, CA (US); Cesar Salazar, Naucalpan (MX); Lane B. Halley, New York, NY (US); Thomas A. Grant, Foster City, CA (US)

(73) Assignee: The Innovation Games Company, Mountain View, CA (US)

( * ) Notice: Subject to any disclaimer, the term of this patent is extended or adjusted under 35 U.S.C. 154(b) by 844 days.

(21) Appl. No.: 12/901,291

(22) Filed: Oct. 8, 2010

(65) Prior Publication Data

US 2012/0088561 A1    Apr. 12, 2012

Related U.S. Application Data

(60) Provisional application No. 61/391,050, filed on Oct. 7, 2010.

(51) Int. Cl.
*A63F 9/24*     (2006.01)
*A63F 9/18*     (2006.01)
*A63F 13/40*    (2014.01)

(52) U.S. Cl.
CPC ............. *A63F 9/183* (2013.01); *A63F 13/10* (2013.01); *A63F 2300/61* (2013.01); *A63F 2300/8064* (2013.01)

(58) Field of Classification Search
USPC ................................. 463/9, 40; 273/429–431
See application file for complete search history.

(56) References Cited

U.S. PATENT DOCUMENTS

| 6,394,899 B1* | 5/2002 | Walker .............................. 463/9 |
| 6,406,302 B1* | 6/2002 | Nelson ........................... 434/322 |
| 2007/0273101 A1* | 11/2007 | Berke et al. ................... 273/430 |
| 2011/0230246 A1* | 9/2011 | Brook et al. ...................... 463/9 |
| 2012/0088583 A1* | 4/2012 | Moreno .......................... 463/40 |

OTHER PUBLICATIONS

"Scattergories Instructions," published by Hasbro, Inc., available on or before Dec. 21, 2003, retrieved from URL <http://www.hasbro.com/common/instruct/Scattergories_(2003).pdf>, 2 pages.*
"Loaded Questions Instructions," published by All Things Equal, available on or before Oct. 7, 2010, retrieved from URL <http://www.familyandpartygames.com/pdf/LQ-Instructions.pdf>, 2 pages.*

(Continued)

*Primary Examiner* — Jason Skaarup
(74) *Attorney, Agent, or Firm* — Sheppard, Mullin, Richter & Hampton LLP

(57) ABSTRACT

Systems and methods for scoring familiarity are disclosed. In some embodiments, a method comprises selecting a topic by a first user, presenting items associated with the topic to the first user, ranking a first set of the items by the first user, presenting the items to a second user, ranking a second set of the items by the second user, and scoring the second ranking relative to the first ranking.

26 Claims, 19 Drawing Sheets

(56) References Cited

OTHER PUBLICATIONS

Description of "Take Your Pick: Movies, Music & More" game which was published by SimplyFun on or before Dec. 31, 2007 and accessible via URL <http://boardgamegeek.com/boardgameexpansion/28613/take-your-pick-movies-music-more>, 3 pages.*

"SimplyFun Playology—Take Your Pick" published to YouTube by SimplyFunVideo on Jan. 25, 2012.*

* cited by examiner

Who's the first VIP? (Very Interesting Person)

Jane Peterson

Lisa Rotschild

Julian Ramirez

PLAYER ONE, ROUND ONE
Lisa Rotschild

What are Jane Peterson's five favorite Geek Movies & TV Shows?

00:07.2
DONE

| 1 | Mad Max |
| 2 | Waterworld |
| 3 | Avatar |
| 4 | War Games |
| 5 | Judge Dread |

SYSTEMS AND METHODS FOR SCORING FAMILIARITY

REFERENCE TO EARLIER-FILED APPLICATION

This Application claims benefit to and incorporates by reference U.S. Provisional Patent Application Ser. No. 61/391,050, filed Oct. 7, 2010, entitled "Systems and Methods for Scoring Familiarity."

BACKGROUND

1. Field of the Invention

The present invention generally relates to measuring familiarity. More particularly, the invention relates to systems and methods for scoring familiarity.

2. Description of Related Art

People play games for many reasons including for entertainment, distraction, and stress relief. Games can also provide an activity that allows people to interact. For example, many games require multiple players to compete or work together towards a common goal. Although games often bring people together, most games do not help people learn about each other. Rather, gaming often provides a social diversion.

Games that do allow players to interact with each other more directly typically do not allow the different players to get to know each other. For example, some games require the drawing of pictures or answering trivia questions. Although these games may address different people's knowledge or skill level, they do not help people to get to know each other.

SUMMARY OF THE INVENTION

Systems and methods for scoring familiarity are disclosed. In some embodiments, a method comprises selecting a topic by a first user, presenting items associated with the topic to the first, user, ranking a first set of the items by the first user, presenting the items to a second user, ranking a second set of the items by the second user, and scoring the second ranking relative to the first ranking.

The second set of items may comprise the same items as the first set of items. In some embodiments, an order of the items presented to the second user is not related to the ranking of the first set of items.

The method may further comprise presenting an award to the first or second user based at least in part on the scoring. The method may comprise determining, by the first user, the award and presenting the award comprises the first user selecting the second user. Selecting a topic by the first user may comprise selecting the topic to present based on a previously selected topic by the first user. Presenting items associated with the topic to the first user may comprise the first user identifying items associated with the topic and displaying the identified items to the first user. The ranking of the second set of items by the second user may comprise the second user ranking the second set of items based on what the second user guesses what other users will rank the second set of items.

The first set of items may include all of the items presented to the first user. The scoring of the second ranking relative to the first ranking may comprise comparing the second ranking to the first ranking and providing points based on the comparison. Presenting items associated with the topic to the first user may comprise the first user inputting one or more items.

In various embodiments, the method may further comprise presenting the items to a third user, ranking a third set of the items by the third user, and scoring the third ranking relative to the first ranking. Further, the method may comprise comparing the scores of the second ranking relative to the first ranking, comparing the scores of the third ranking relative to the first ranking, and presenting an award based on the comparisons. The method may further comprise displaying a leaderboard, the leaderboard comprising displaying an identifier and score associated with the second user as well as an identifier and score associated with the third user.

Selecting a topic by a first user may comprise selecting a topic associated with a celebrity. Scoring the second ranking relative to the first ranking may comprise comparing the first ranking and the second ranking to a predetermined ranking and scoring the first ranking and the second ranking based on the comparisons.

An exemplary system may comprise a topic module, a GUI module, a ranking module, and a scoring module. The topic module may be configured to receive a topic selection from a first user. The GUI module may be configured to present items associated with the topic to the first user and present the items to a second user. The ranking module may be configured to rank a first set of the items by the first user and rank a second set of the items by the second user. The scoring module may be configured to score the second ranking relative to the first ranking.

DETAILED DESCRIPTION OF THE INVENTION

In some embodiments, a multi-player game is described. A goal of the multi-player game may be, in some embodiments, to see how well different players know each other. For example, the person who knows the other players the best may win the game.

In one example, at the start of the game, one player is selected as the first VIP (the Very Interesting Person). The VIP may select a topic (such as "Favorite Ice Cream"). The VIP may then select a predetermined number of items associated with the topic (e.g., vanilla, chocolate, strawberry, rocky road, and pistachio). Subsequently, the VIP may rank the selected items according to the VIP's preference.

Each of the other players may be presented with the topic and a list of possible items. Each player may select and order the items (i.e., rank items) based on what they believe are the VIP's preferences.

Each player's ordered list (i.e., ranking) may be compared to the VIP's ordered list. A score may be computed based on how well the players know the VIP (e.g., more matches producing a higher score). After scoring a "round" is completed, another player may be the VIP (e.g., a different player selects a new topic and ranks new items). The other players including the previous VIP subsequently rank the new items based on what they believe are the new VIP's preferences.

In some embodiments, play continues until each person in the game has been the VIP. After the final round, the scores from the rounds of each of the players may be individually aggregated and shared.

Figure 1:
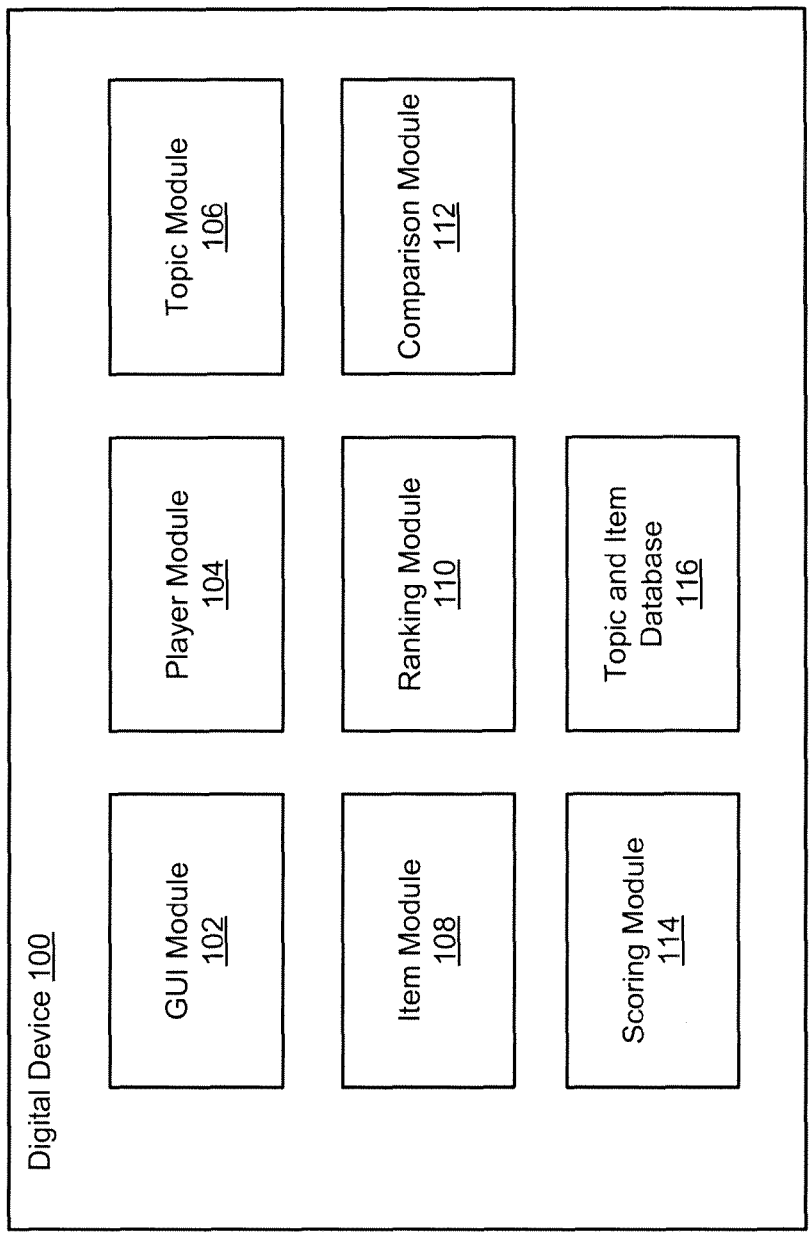
FIG. 1 depicts a digital device in some embodiments.

FIG. 1 depicts a digital device 100 in some embodiments. In various embodiments, a first player of a group of player may be the VIP. The VIP may select a topic utilizing the digital device 100. A digital device 100 is any device with a processor and memory. A digital device may be, but is not limited to, an iPad, media pad, media player, smartphone, cellphone, telephone, television, computer, notebook, netbook, or eBook reader. The digital device is further described in FIG. 13.

The digital device may comprise a GUI module 102, a player module 104, a topic module 106, an item module 108, a ranking module 110, a comparison module 112, a scoring module 114, and a topic and item database 116. The GUI module 102 may depict a graphical user interface on a display of or a display coupled to the digital device 100. The GUI module 102 may display a request for players to identify themselves (i.e., display a request for player identifiers), display a request for a VIP selection, display possible topics, display possible items associated with the topics, allow the VIP and/or other players to rank the items, and display one or more scores.

A player module 104 may be configured to identify players. In some embodiments, a player module 104 allows players to input a player identifier. A player identifier may comprise a name, username, picture, one or more numbers, one or more letters, image, or any other identifier. Those skilled in the art will appreciate that the player identifier(s) may comprise any combination of words, letters, numbers, or media (e.g., pictures, video, or audio). The player identifiers and any other information of the players may be stored in the topic and item database 116.

In some embodiments, the player identifier may be a social network identifier. A social network identifier may be an identifier for a person or computer that is related to a social network such as Facebook, LinkedIn, Myspace, or the like. For example, a Facebook identifier may be used.

Further, in some embodiments, topics, items, item rankings, and/or scoring may be published in a social network site. For example, if the player identifier is or is associated with a social network identifier, selected topics, items, rankings, and/or scoring may be published in a social network associated with the social network identifier.

In some embodiments, the player module 104 may control the GUI module 102 to display a list of potential players. For example, a list of friends of a player may be displayed on the digital device 100. One or more players may select from the list of players to create a player list. Once the players are identified, one of the players of the player list may be chosen to be a Very Important Person (VIP). The VIP selection may be received by the player module 104. The VIP may select a topic and may determine an ordered list of items associated with the topic. The topic can be, for example, text, graphics, video, sound, images, or any combination thereof. The other players may then rank all or some of the items based on what they how they believe that the VIP ordered the items.

The topic module 106 may be configured to control the GUI module 102 to present one or more topics on the digital device 100. For example, once a player is chosen to be a VIP, the topic module 106 may allow the VIP to select from multiple possible topics. The topic module may retrieve on one or more possible topics from the topic and item database 116. In other embodiments, the topic module 106 may provide a single topic.

The topic may be any general category from which items may be selected and/or identified. For example, a player may select the topic: "favorite cars." Any number of items may be associated with the topic. For example, items associated with the topic "favorite cars" may include "1969 Dodge Daytona," "Boss 302 Mustang," "1969 Dodge Charger 500," "1967 Mustang GT," or the like.

In various embodiments, the topic module 106 retrieves topics associated with the VIP from the topic and item database 116. In one example, topics associated with the VIP include topics that the VIP has previously chosen, topics related to topics that the VIP has previously chosen, popular topics with other players, popular topics for game play generally, topics associated with the geographic location of the player, topics associated by a company or entity that owns the device being used for the game play, or any other kind of topic.

In some embodiments, featured topics may be provided. For example, a business may pay a fee to have a topic featured. For example, a featured topic including favorite books may be sponsored by Amazon.com, a book publisher, an author, or a local library.

Those skilled in the art will appreciate that featured topics may be selected by the topic module 106 based on any kind of criteria. For example, the physical location of one or more players may be used to select featured topics sponsored by local businesses. Featured topics may also be selected based on previous rankings by one or more players. In one example, a featured topic of favorite ice cream flavors sponsored by Ben and Jerry's may be displayed if one or more players have previously ranked ice cream flavors. The topic module 106 may select topics based on any information. For example, the topic module 106 may select featured topics or unfeatured topics based on previously stored player preferences, demographic data managed or stored in other databases, location, temperature, previous games, previous rankings, previous topic selections, and/or any other information.

In various embodiments, a sponsor may collect information regarding each round and/or game. The information may allow the sponsor to make changes. For example, Ben &

Jerry's may wish to test different icons associates with a new ice cream flavor (e.g., an item identifier). Ben & Jerry's may collect information regarding player selections and ranking and change the icon to the new ice cream flavor. Ben & Jerry's may continue to collect information regarding player selections and ranking in subsequent games and/or rounds and analyze the data.

Further, a sponsor may, in some embodiments, control the order in which featured topics ad/or items may be displayed. In some examples, the sponsor may control the way the information is displayed to gauge player reaction or to correct for order bias.

Information stored in a player's social network may be used to select, recommend, or suggest topics and/or items. In one example, the topic module 106 may retrieve potential topics and/or items from a player's Facebook page. The topics and/or items may then be presented to the player. In another example, a player's Facebook page may indicate that they prefer a particular type of music (e.g., late 60's). The topic module 106 may receive information from the Facebook page and/or scan the Facebook page to determine the player's interests, and then retrieve one or more topics from the topic and item database 116. In this example, the topic manager 106 may retrieve a topic "favorite bands" as well as any number of band names from the late 60s as items to present to the player. In some embodiments, topics and/or items may be received from the social network site rather than retrieved from the topic and item database 116.

Those skilled in the art will appreciate that new topics and/or items may be downloaded to the digital device 100. In some embodiments, the player may indicate what topics and/or items are of interest to the player (e.g., by providing preferences described further herein). Alternately, a company, organization, system administrator, or the like may select and provide topics and/or items may be downloaded to the digital device 100 (e.g., if the digital device 100 is company property).

In some embodiments, business and celebrities may provide incentives for players to choose topics related to the business and/or celebrities. For example, if a famous person is visiting a local area (e.g., San Francisco), they may provide topics and items that are related to the event (e.g., a concert), the location, or facts they wish potential attendees to be aware of. In some embodiments, the business and/or celebrity may provide a prize to a contest winner that knows the business or celebrity best.

The item module 108 is configured to control the GUI module 102 to display one or more items associated with the selected topic. The item can be, similar to the topic for example, text, graphics, video, sound, images, or any combination thereof. The item module 108 may receive the selected topic from the topic module 106 and retrieve items associated with the topic from the topic and item database 116. In some embodiments, the item module 108 provides a predetermined number of items. In one example, the item module 108 controls the GUI module 102 to present eight items associated with the topic to the VIP.

In various embodiments, the item module 108 may receive items from a player. For example, the VIP may select a topic of favorite soft drinks. The VIP may input one or more different soft drinks as items to be displayed and/or ranked (e.g., the VIP inputs a favorite soft drink that is not identified in the list of items displayed by the GUI module 102).

The ranking module 110 is configured to receive a ranking of all or some of the items. In one example, the item module 108 may present a predetermined number of items to the VIP (e.g., via a display on the digital device 100). The VIP may rank all or a predetermined number of the items by preference.

For example, after selecting the topic, the VIP may then identify and order a predetermined number of items. The VIP may select one or more items from a list of items and/or enter one or more items (e.g., by inputting or writing one or more items). The VIP may then rank the items. The order of the items may indicate the VIP's preferences. For example, a VIP may rank a list of cars in order of preference (e.g., the first item being the VIP's favorite).

In some embodiments, once a ranking has been received, the ranking module 110 may control the GUI module 102 to display a request to determine if the ranking is complete. In one example, the GUI module 102 may display an icon (e.g., button or other indicator) on a display of the digital device 100 to the VIP. When activated, the VIP may indicate that they have completed ranking the items. The GUI module 102 may also allow the VIP to continue rearranging, re-ranking, or selecting new items (e.g., by activating a virtual input such as a button, activating a hardware input, or otherwise indicating completion). If ranking is not completed, the ranking module 110 may allow the VIP to make changes and/or continue ranking all or some of the items.

Once the VIP has completed ranking the items, the player module 104 may control the GUI module 102 to display a request to identify the next player. Once the next player is identified (e.g., by selecting a player identifier presented by the GUI module 102), the player may be presented with a plurality of items. The player may then select one or more of the items and rank them as they expect the VIP to rank the items. Once completed, the player module 104 may control the GUI module 102 to display a request to identify the next player. The round may continue until each player of the group has the opportunity to rank items.

Once all of the players have ranked all or some of the items, the comparison module 112 may compare each player's ranking to the VIP's ranking. The comparison module 112 may track similarity and/or order of items. The scoring module 114 may score the items based on the comparison of each player's ranking of items to the VIP's ranking.

The scoring module 114 may score the comparison in any number of ways. For example, the scoring module 114 may provide points for every item that a player selected if the item was also selected by-the VIP. Similarly, the scoring module 114 may provide points for ranking an item correctly (e.g., the player's ranking of an item is the same rank as the VIP's ranking). The scoring module 114 may provide bonus points for the player that ranked the highest number of items correctly when compared to other players.

Once every round has been completed and every player has been a VIP, the scoring module 114 may aggregate points and identify a winner of the game. In some embodiments, the scoring module 114 may also initiate a playoff game when two players have the same or similar scores.

The scoring module 114 may also identify a winner of each round, a winner of the game (e.g., by computing an overall score of all rounds for each player) provide virtual badges, virtual trophies, coupons, or any other award. Awards may be given for frequent play or skillful play. Penalties that decrease the score of a player may also be introduced.

The topic and item database 116 is any data structure that is configured to store topics and/or items. In some embodiments, the topic and item database 116 also stores player identifiers and tracks the rankings, topic selections, and item selections for each player. The topic and item database 116 may also provide featured topics based on one or more player identifiers, player browsing history, past topics and/or items selected or ranked, for example. This information may also be utilized to provide targeted marketing, display advertisements on the digital device 100, and/or assist in marketing of others.

In some embodiments, the digital device 100 may communicate with a server over a network. The digital device 102 may receive updated topics and/or items from the server. Further, in various embodiments, the digital device 100 may provide the player identifiers, past rankings, topic selections, and item selections associated with one or more player identifiers. The server may provide topics and items associated with the player identifiers, past rankings, topic selections, and item selections to the topic and item database 116.

Those skilled in the art will appreciate that a module may comprise, individually or in combination with other modules, software, hardware, firmware, circuitry, or any combination thereof.

Figure 2:
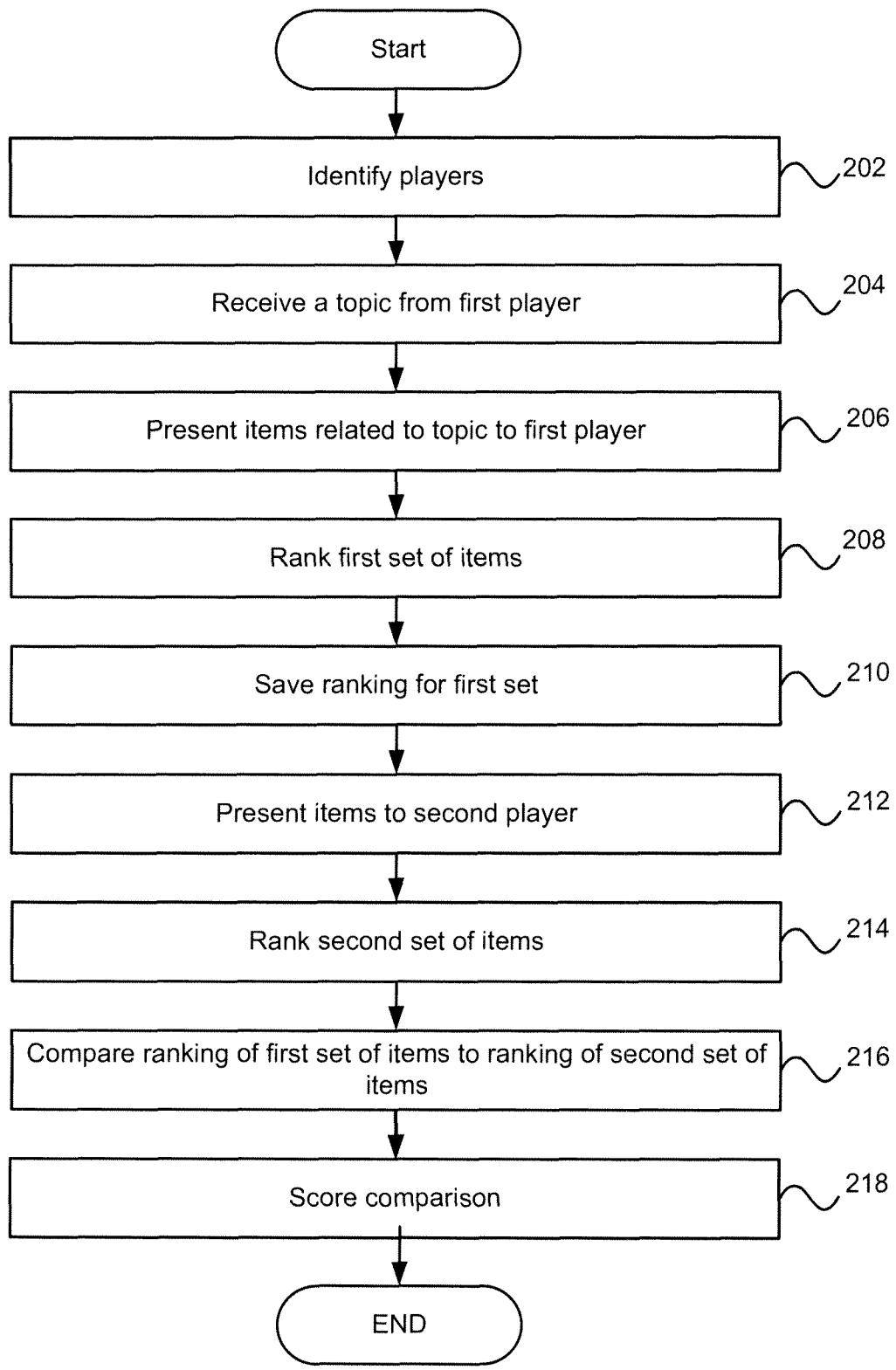
FIG. 2 is a flow chart depicting a method for scoring familiarity in some embodiments.

FIG. 2 is a flow chart depicting a method for scoring familiarity in some embodiments. In step 202, the player module 104 identifies players (e.g., receives player identifiers). In one example, the GUI module 102 may display a request on the digital device 100 to identify one or more players. Once the players are identified, the GUI module 102 may display a request to indicate which player will begin. In one example, the first player is the VIP.

In step 204, the topic module 106 may receive a topic from the first player. In some embodiments, the topic module 106 may display one or more topics to the first player. The first player may either select a topic provided by the topic module 106 or the first player may input a new topic. For example, the first player may enter "favorite hockey teams" as a new topic. The new topic may be associated with the first player and/or stored in the topic and item database 116.

In step 206, the GUI module 102 may display items related to the selected topic. In some embodiments, the item module 108 retrieves items related to the topic from the topic and item database 116 and displays the items via the GUI module 102.

The first player may also, in some embodiments, input new items. In one example, the first player may type or otherwise input items (e.g., favorite hockey team names) into the digital device 100. The item module 108 may associate the new items with the first player and/or the topic. The new items may also be stored in the topic and item database 116.

In various embodiments, a player may select an item or topic and receive additional information about the item or topic. For example, if the player selects an item (e.g., pushes down on the item for a period of time on a touch screen), a little "circle i" icon may appear on the item. This "circle i" icon may indicate that information is available. If the player subsequently selects the "circle i" icon, additional, extended information about the item may be displayed (e.g., either in a new screen or in a pop-up window).

In some embodiments, certain items may be designated to be controlled by the creator of the item. For example, a business, famous person, organization, or the like (i.e., a provider), may provide topics and/or items. When a player selects the provided topic and/or item, the provided topic and/or item may be configured to invoke a web site, present a customized set of content regarding the provider, or perform a series of actions on behalf of the player. Other topics and/or items may be designed to be under the control of the players of the game, who may, in some embodiments, configure this information to invoke a web site, present a customized set of content, or the like.

In step 208, the first player may rank a set of items from the available items depicted on the digital device 102. The items ranked by the first player may be less than the total number of displayed items. For example, the GUI module 102 may display ten different possible items to rank and request that the first player rank only five.

The first player may rank items in any number of ways. In various embodiments, the GUI module 102 displays a variety of different items and the first player may select each item to be ranked. For example, the first player may drag a representation (or other identifier) of an item onto an ordered list in order to rank the selected item(s). Those skilled in the art will appreciate that the first player may rank the items in any number of ways.

In step 210, the ranking module 110 saves the first player's ranking. In one example, the first player may indicate that the ranking is complete (e.g., by activating a virtual button on the graphical user interface). The ranking module 110 may then save the first player's ranking. Those skilled in the art will appreciate that the first player may indicate that they have completed ranking items in any number of ways.

The player module 104 may control the GUI module 102 to display a request for the next player to indicate that they are ready. In some embodiments, the player module 104 may control the GUI module 102 to display player list. A second player may be selected from the list of players. The list of player identifiers does not include the identifier of the first player (i.e., the first VIP) or, alternately, the player identifier of the first player may appear but may not be selectable (e.g., greyed out or with a line through all or part of the identifier).

In step 212, the GUI module 102 may present the items to the second player. The items may include all or some of the same items presented to the first player. In some embodiments, the presented items may include any items input by the first player. In various embodiments, the presented items may include items that were not initially provided to the first player.

In step 214, the second player may rank a second set of items. The second set of items may comprise the same items ranked by the first player. In one example, the second player makes their best guess of what the first player may select and rank. The second player may then attempt to select and rank various items based on their familiarity with the first player.

In step 216, the comparison module 112 compares the second player's ranking of items to the first player's ranking. In step 218, the comparison is scored. In various embodiments, the second player may receive a predetermined number of points for ranking an item that the first player selected. The second player may also receive a predetermined number of points for ranking an item at the same ranking of the first player. Bonus points may be received for ranking two or more items correctly or ranking all of the items correctly.

In some embodiments, a score may be computed by comparing the first item by the second player to the first item of the first player. For example, the following method may be used:

```
+ (int)getSimpleScoreFromLikeList:(NSMutableArray*)original
andResult:(NSMutableArray*)result{
    int simpleScore = 0;
    for (int i = 0; i < [original count]; i++) {
        if ([original objectAtIndex:i] == [result objectAtIndex:i]) {
            simpleScore += ([original count] - i) * 100;
        }
    }
    return simpleScore;
}
```

Scoring may be computed in any number of ways. For example, scoring may be performed by the following methods:

1. The simple score multiplier may be 10, 100, 1,000.
2. A sliding scale may be created and based on:
    the match position—for example, matching the first item may be worth 500 points, the second item may be worth 350, the third item may be worth 180, and so forth.
    the difficulty of the topic or the difficulty of the items within the topic (e.g., players may be able to guess your musical genres much more easily/accurately than your favorite professors in college).

The score can also be computed by examining the distance between items, which may be computed by determining the moves that it would take a player to convert one list into another list. In one exemplary algorithm is as follows:

```
function <getDistanceScore>(<vipAnswer>,<playerAnswer>)
    <score> = 0
    for <item> in <vipAnswer> {
        <correctPosition> = <vipAnswer>.<getPositionOfItem>(<item>)
        <answerPosition> =
        <playerAnswer>.<getPositionOfItem>(<item>)
        <distance>+= <abs>(<correctPosition> - <answerPosition>) //
<abs> returns the absolute value of a integer number.
        <score> += <max>(<correctPosition> - <distance> ,0) // <max>
picks the max value from 2 numbers
    }
    return <score>;
}
```

In one example, the algorithm checks every item, calculates distance, and then adds the position—distance (or 0 if negative) to the score.

In some embodiments, the score can be adjusted by how quickly a player guessed the VIP's ranking (e.g., a timer tracks the time required by each player to rank the items). A player may get a bonus if the player ranks the items faster than another player or ranks items correctly before the expiration of a predetermined time period.

During the game it is possible for a VIP to pick a topic so obscure or challenging that players are unlikely to rank items successfully. In those circumstances, the scoring module 114 may use a "shared success" scoring algorithm. In this model, the VIP may select a "challenge" rating for the topic (e.g., a number from 1 to 5, with 1 being easier and 5 being harder). Each player may also pick a challenge rating when the topic is presented. A bonus score may be provided to the players and the VIP when their ratings match. In some embodiments, the simple scoring algorithm might be adjusted based on very hard topics. In various embodiments, however, a penalty may be deducted if the challenge rating is so high that none of the players score any points.

In various embodiments, the VIP may "bluff." As a result, the score may be adjusted to reflect the bluff. In one example, a VIP is presented with a list of favorite ice cream flavors. The VIP may play the game normally and rank the list from the VIP's most favorite ice cream flavors to least favorite ice cream flavors. Alternately, the VIP may decide to "bluff." In some embodiments, the VIP indicates their intention to bluff by activating a control on a graphical user interface and/or display. The VIP may order the items from least favorite to most favorite or in some other random way. When the second player ranks the list, the second player may rank the list based on what the VIP may prefer. Subsequently, the VIP's ranking may be shared with the second player. In some embodiments, the second player may be given the chance to assert that the VIP is bluffing. If the second player correctly asserts that the VIP is bluffing, the second player may be given a bonus score. If the second player incorrectly asserts that the VIP is bluffing, the second player may be given a penalty (e.g., points are removed).

In various embodiments, each player of a group has an opportunity to rank items and compare their ranking to the first player. In some embodiments, the player with the ranking of items most similar to the first player may be declared the winner and/or receive points.

Once all or some of the players have had an opportunity, the GUI module 102 may display the each player's rankings as well as the first player's ranking. Each player may, in some embodiments, compare their ranking to the first player's ranking. The GUI module 102 may provide a graph (e.g., bar graph, line graph, scatter plot, or the like) comparing each player's results to each other.

Those skilled in the art will appreciate that, in some embodiments, each member of a group of players may each have the opportunity to be the VIP (e.g., select a topic and rank a subset of items). When one player is the VIP, the other players have the opportunity to select items and rank them as they think the VIP would rank the items. Once all players have ranked the items, a comparison of each ranking to the VIP rankings may be performed and/or a new VIP is chosen. The scoring module 114 may score each player's attempt to rank items. Once all players have had the opportunity to be a VIP, the game may end and a winner may be declared (e.g., the scoring module 114 may score up all of the points for all of the players over the rounds and the winner with the most points may be identified).

In various embodiments, at the end of a game or a round, players in the game may be given the option to share their results (e.g., rankings, selected items, selected topics, history, or preferences) with vendors, or the like. Vendors, in turn, may be able o send additional information to the players, such as coupons, related to the shared information.

In some embodiments, a player may guess the ranking of the VIP and/or set their own ranking (e.g., based on the player's preferences). In one example, the VIP and/or other players may have the opportunity to guess the player's ranking. In some embodiments, the VIP may score points for guessing the player's preferences. Similar to the VIP's ranking, the player's ranking of items may be associated with the player identifier and stored in the topic and item database 116. The rankings of players may be used to provide, for example, topic suggestions, item suggestions, awards, and/or coupons. All information collected regarding players' choices and rankings may be used in conjunction with various analytics.

Figure 3:
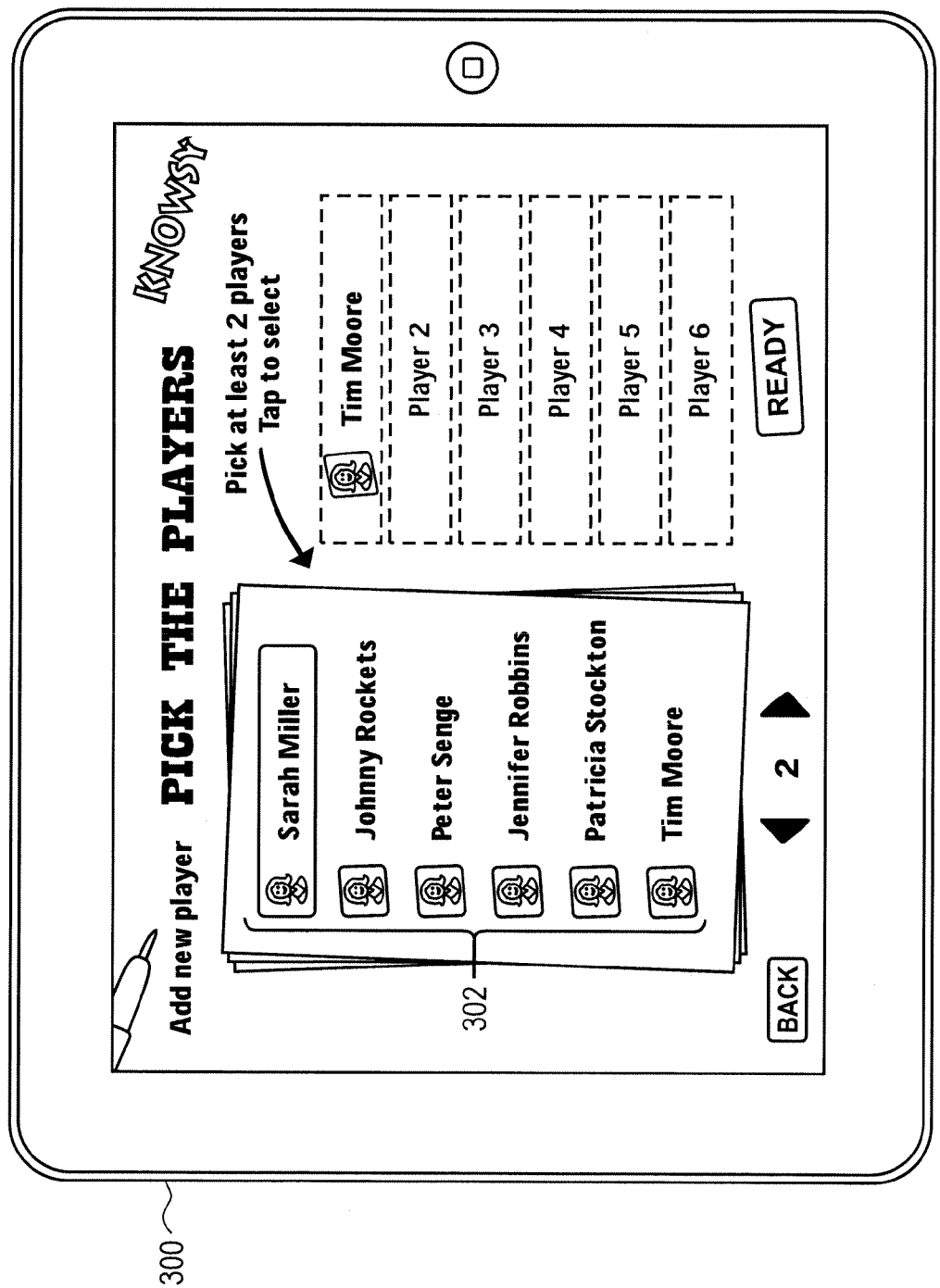
FIG. 3 is an exemplary display depicting picking of players in some embodiments.

FIG. 3 is an exemplary display 300 depicting picking of players in some embodiments. Screen 300 identifies possible users (e.g., players) by player identifier (i.e., Sarah Miller, Johnny Rockets, Peter Senge, Jennifer Robbins, Patricia Stockton, and Tim Moore). In this example, the players are identified by name, but any player identifier may be used. Similarly, in some embodiments, players may be identified by name (e.g., username, nickname, or first name) as well as an icon (e.g., picture or image). In some embodiments, the GUI module 102 may provide a selection of images and/or other media that a player may choose as a representation during gameplay.

There may be any number of players. In some embodiments, a player may scroll or page through a list of player identifiers 302 to select the players that will be playing. A player may select a name by dragging one or more from the player list into open slots (e.g., Tim Moore is depicted within an open slot). Those skilled in the art will appreciate that player identifiers may be activated in any number of ways.

Once a desired number of players have been identified, a player may start the game (e.g., by activating a "ready" button). Those skilled in the art will appreciate that there may be many ways to start the game (e.g., activating a GUI control, activating hardware control, waiting a predetermined period of time, shaking the device, or so on).

In some embodiments, the player identifiers may include or be associated with social network identifiers. In one example, the list of players may comprise one or more users of a social network site. One player may select players from the list of player identifiers 302 to provide players an invitation to play or to include other players on a social network site in a game across a network. In another example, one or more players who are associated with a central server may be included in the game. Those skilled in the art will appreciate that the players need not be co-located. For example, one or more players may be remote from each other but still play the game across one or more networks.

In various embodiments, players may play the game across one or more social network sites. For example, when a player accesses their social network page (i.e., Facebook page), they may be authenticated to play the game, invite other players, receive scores and/or awards.

Figure 4:
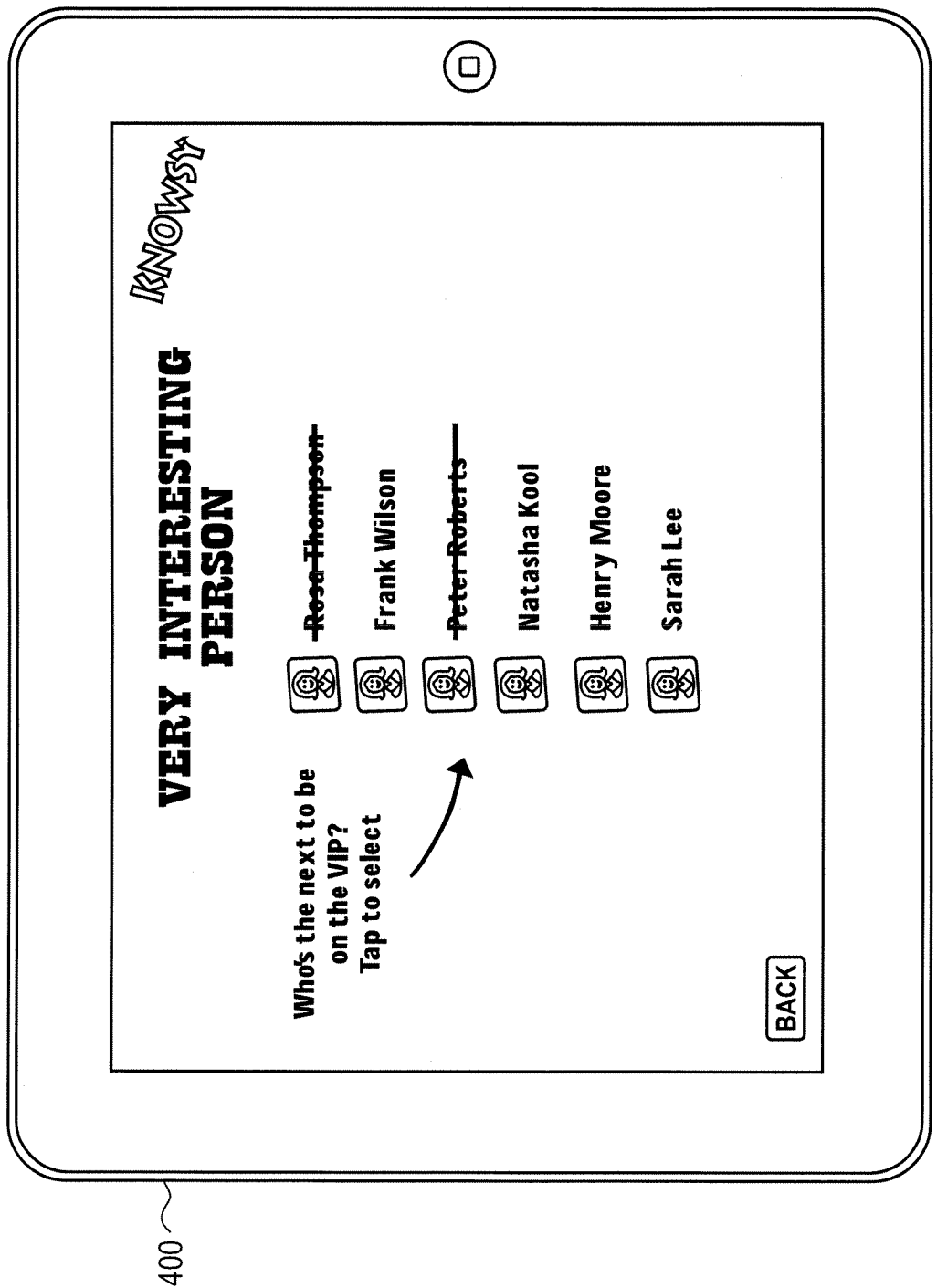
FIG. 4 is an exemplary display depicting selection of a very interesting person (VIP) in some embodiments.

FIG. 4 is an exemplary display 400 depicting selection of a very interesting person (VIP) in some embodiments. The display may display any number of player identifiers. In this example, a game is being played by Rosa Thompson, Frank Wilson, Peter Roberts, Natasha Kool, Henry Moore, and Sarah Lee. Rosa Thompson and Peter Roberts have already been VIPs in previous rounds and, as a result, their player identifiers indicate that they are not eligible to be the VIP for the next round. The game may end when all players have been the VIP at least once. Those skilled in the art will appreciate that one or more players may be the VIP any number of times within a game.

Figure 5:
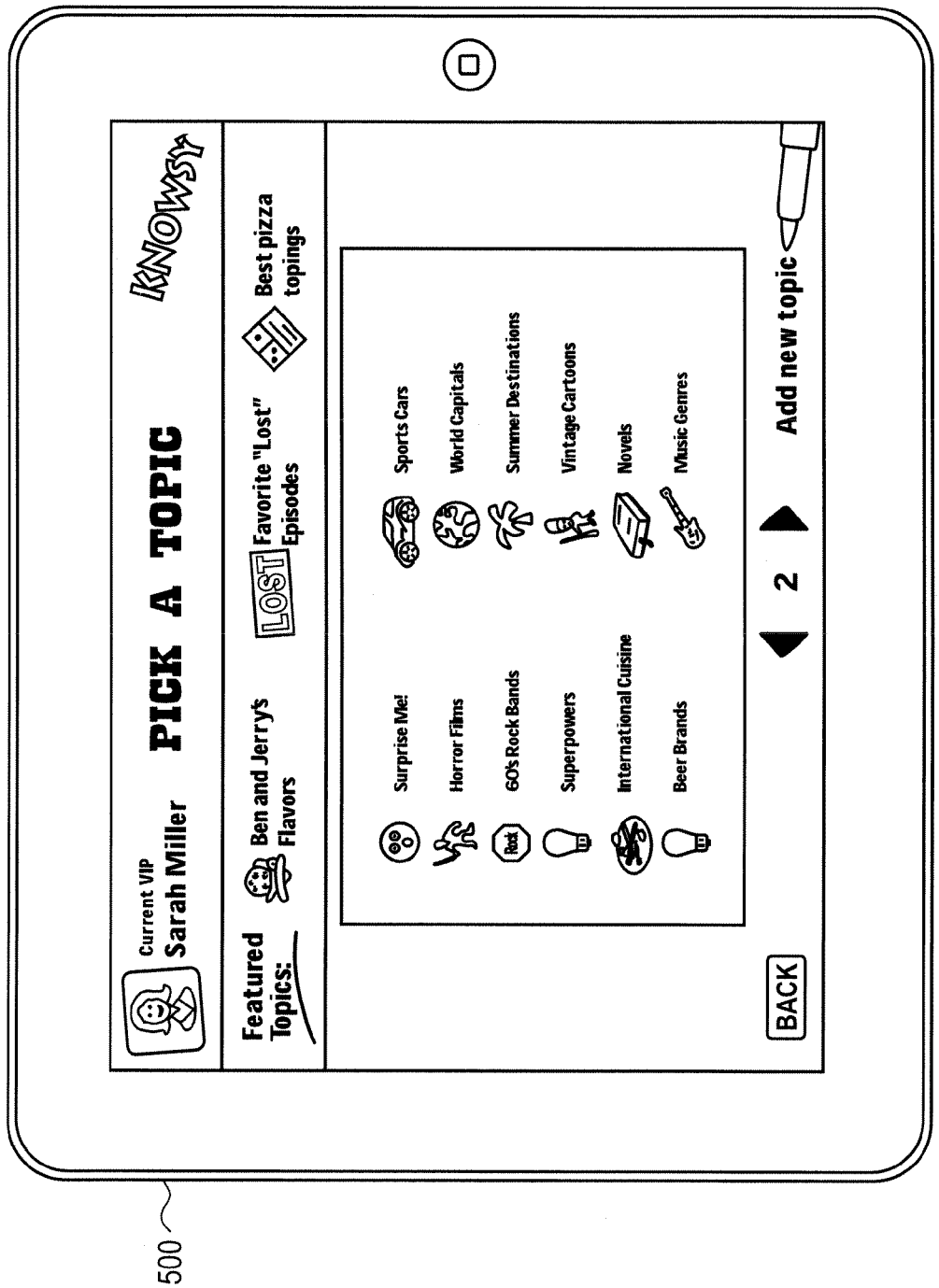
FIG. 5 is an exemplary display depicting topics to select n some embodiments.

FIG. 5 is an exemplary display 500 depicting topics to select in some embodiments. Once the VIP is selected (e.g., Sarah Miller), the VIP may select a topic. The GUI module 102 may display predetermined topics. In some embodiments, the GUI module 102 may display featured topics such as Ben and Jerry's Flavors, Favorite "Lost" Episodes, or Best Pizza Toppings. Non-featured topics may include Surprise Me!, Horror Films, 60's Rock Bands, Superpowers, International Cuisine, Beer Brands, Sports Cars, World Capitals, Summer Destinations, Vintage Cartoons, Novels, and Music Genres.

In various embodiments, the topic module 106 may provide topics based on the player identifier. For example, the player associated with the player identifier "Sarah Miller" may be associated with topics that the player has chosen before in previous games. Similarly, topics may be selected which are similar or otherwise related to previous topics the player has chosen before. In one example, topics selected by the player and/or items associated with the topic may be associated with the selecting player and stored in the topic and item database 116. In subsequent games, when the player is the VIP, the topic module 106 and/or the item module 108 may select topics and/or items from or associated with the topic and item database 116.

In some embodiments, the VIP may choose to add a new topic (e.g., by activating the portion of the screen 500 that depicts "Add new topic"). When the VIP decides to add a new topic, the VIP may be requested to input a name or other identifier for the topic.

Figure 6:
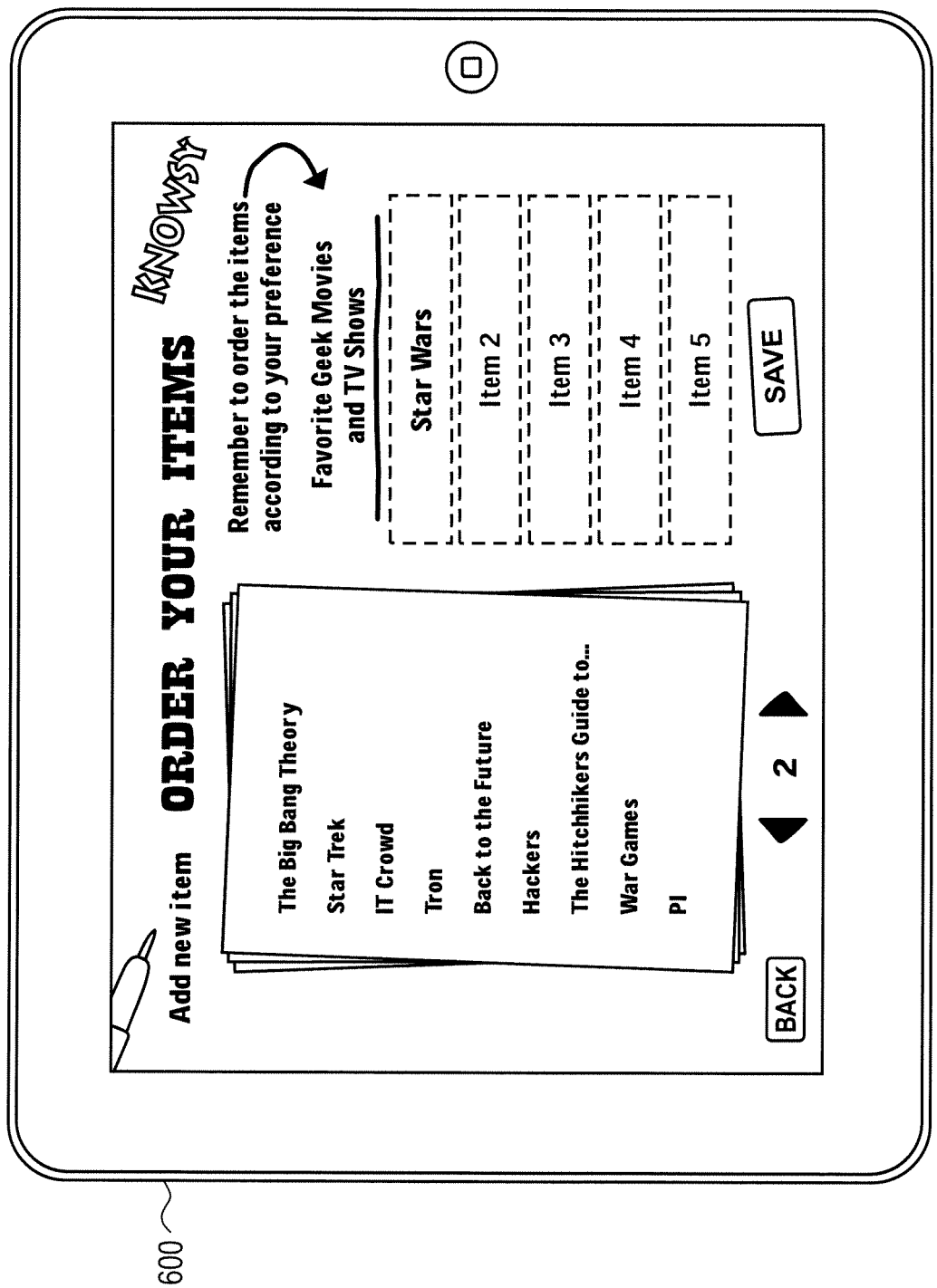
FIG. 6 is an exemplary display depicting items associated with a selected topic in some embodiments.

FIG. 6 is an exemplary display 600 depicting items associated with a selected topic in some embodiments. In display 600, the VIP chooses the topic "Favorite Geek Movies and TV shows." The VIP may be provided items that are movies and TV shows from which the VIP may choose. The VIP may also choose to add new items (e.g., by activating the portion of the display 600 that depicts "Add new item").

The VIP may click or otherwise select or input an item and rank the items in any order. In some embodiments, a VIP may only select a limited number of items to rank (e.g., five) even if there is a larger number of items to select from. In this example, the VIP has selected "Star Wars" as their favorite movie. The VIP may re-order the ranking in any way they wish (e.g., drag "Star Wars" from the first position to another position). The VIP may scroll or page through any number of items to select from. Once the VIP has chosen and ranked the items, the VIP may indicate that the ranking is completed (e.g., by activating the "save" button).

Figure 7:
FIG. 7 is an exemplary display depicting selection of players in some embodiments.
Figure 7:
Figure 7:

FIG. 7 is an exemplary display depicting selection of players in some embodiments. After the VIP has selected the topic and ranked the items, a request to identify the next player may be displayed. The next player may rank items based on the familiarity of the VIP (e.g., by selecting and ranking items based on what the player believes the VIP selected and ranked the items).

A player may select a player identifier to begin the round. In this example, the next player may be Jane Peterson, Lisa Rotschild, or Julian Ramierz.

Figure 8:
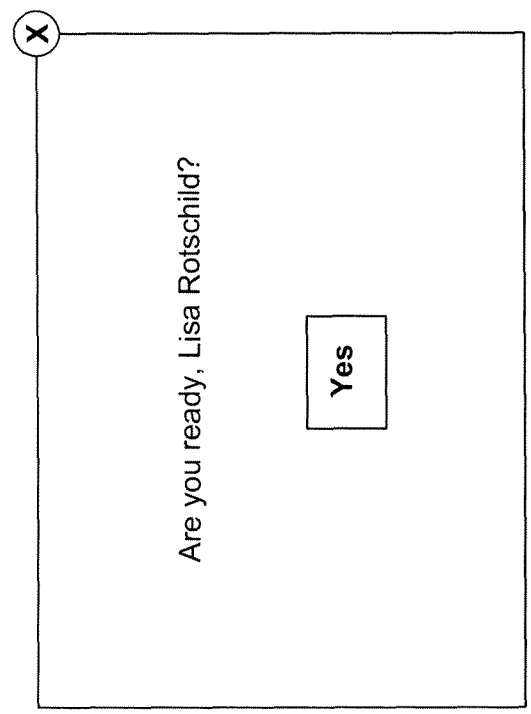
FIG. 8 is an exemplary display requesting a player's readiness in some embodiments.

FIG. 8 is an exemplary display requesting a player's readiness in some embodiments. In this example, the player with a player identifier of Lisa Rotschild may indicate that they are ready to begin selecting and ranking items.

Those skilled in the art will appreciate that the display in FIG. 8 is optional and that the play may begin once the player is selected. More generally, multiple screenflows may be provided such that there may be different presentations for expert players, novice players, first-time players, and so forth.

Figure 9:
FIG. 9 is an exemplary display requesting a ranking in some embodiments.

FIG. 9 is an exemplary display requesting a ranking in some embodiments. In some embodiments, the player identified by player identifier Lisa Rotschild is asked to select and rank the VIP's favorite geek movies and television shows. In some embodiments, the player may select from any number of items and guess what they believe the VIP selected. The player may then rank the items in the order they believed the VIP ranked the items.

In some embodiments, each player may be timed to select and rank the items. Here, the player has selected and ranked the items in 7.2 seconds. In various embodiments, a timer may require that the player rank the items before expiration of a predetermined time. If the time does expire, only items selected and ranked may be scored. In other embodiments, time may be used to calculate a bonus.

In various embodiments, once the player is satisfied with their ranking, the player may activate the "done" button or otherwise indicate that they have completed ranking. Those skilled in the art will appreciate that there are many ways to rank the items and many ways to indicate that the player has finished ranking.

After the first player has completed ranking, the screen may request who the next player will be and then display the items for the next player to select and rank. Once all or some of the players have had the opportunity to rank the items based on what they believe the VIP has ranked the items, the scoring module 114 may score the round.

Figure 10:
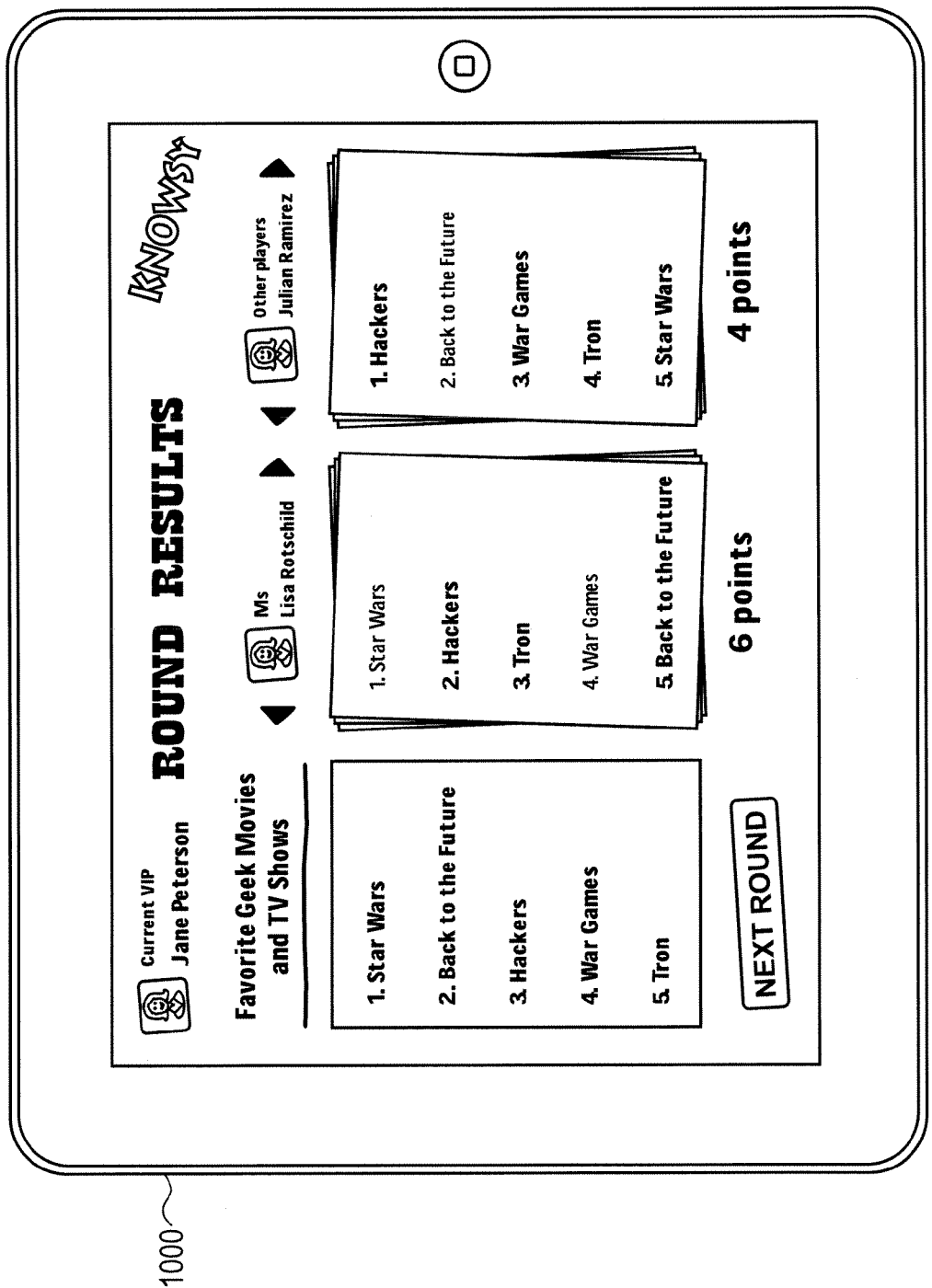
FIG. 10 is an exemplary display depicting scoring of multiple players based on rankings in some embodiments.

FIG. 10 is an exemplary display 1000 depicting scoring of multiple players based on rankings in some embodiments. In this example, the VIP's rankings are shown. Here, the VIP has ranked, in order, Star Wars, Back to the Future, Hackers, War Games, and Tron. The player identified with the player identifier as Lisa Rotschild guessed two items correctly in the correct ranking and guessed the three other items but the items were out of order. The scoring module 114 may score the round per player based on the number of items that they selected that matches the VIP's selections. The scoring module 114 may also score the round per player based on the number of items that the player ranked correctly. In display 1000, Julian Ramirez selected all of the same items as the VIP but only identified one item in the correct order (i.e., Back to the Future). As such, Julian Ramirez received a lower score than Lisa Rotschild.

Once the players have the opportunity to see the ranking of the VIP and compare their own ranking (as well as the rankings of the other players), a player may indicate that they are ready for the next round. When the next round begins, the GUI module 102 may depict a request for the next VIP (as shown in FIG. 4) and the process may continue.

In some embodiments, the game continues until each player has been the VIP, a predetermined number of rounds have been completed, a predetermined time limit is reached, and/or the players choose to end the game. Those skilled in the art will appreciate that there may be any number of events that may signal that the game is completed. When the game is completed, the scores of different players may be computed and displayed. In some embodiments, a winner may be determined based on points scored.

Further, those skilled in the art will appreciate that analytics may be performed to provide targeted advertising. For example, as the VIP selects topics and ranks items, the selected topics and rankings may be stored and associated with the VIP (e.g., with the VIP's player identifier). The digital device may then provide advertisements, present messages, or other opportunities based on the topics and rankings of items. These analytics may take into account the social graph of the players, the rankings of various players, and the manner in which the players have demonstrated familiarity within their social graph.

In various embodiments, each player may rank items based on what they believe the group of players will rank the items (e.g., the group of players act as the VIP). In one example, a game producer (e.g., business) may select a topic and the items within the topic. The game producer may then promote this game to the players. Each player may rank items at least twice. The first ranking is based on the player's preferences. The second and optional subsequent ranking are based on what the player thinks will be the collective or most common ordering of the larger group based on one or more optional attributes that serve to segment the larger group. The winner(s) of the game may be those players who predict the preferences of the group.

In another example, Aunt Mary has a list of friends who watch American Idol. At the start of the season, Aunt Mary invites her friends to play the game. Each week, every person in the group ranks the contestants according to their preferences and what they think this group will select. When the actual winners (or losers, in the case of American Idol) are announced, Aunt Mary's group can see who accurately predicted the outcome of the nation-wide voting as well as Aunt Mary's friends. Any subset of this are also available for the predicted outcome (such as when one of Aunt Mary's friends asserts that he or she can accurately predict the ranking of a known population such as all men between the ages of 23 and 40 who live in Wisconsin).

Figure 11:
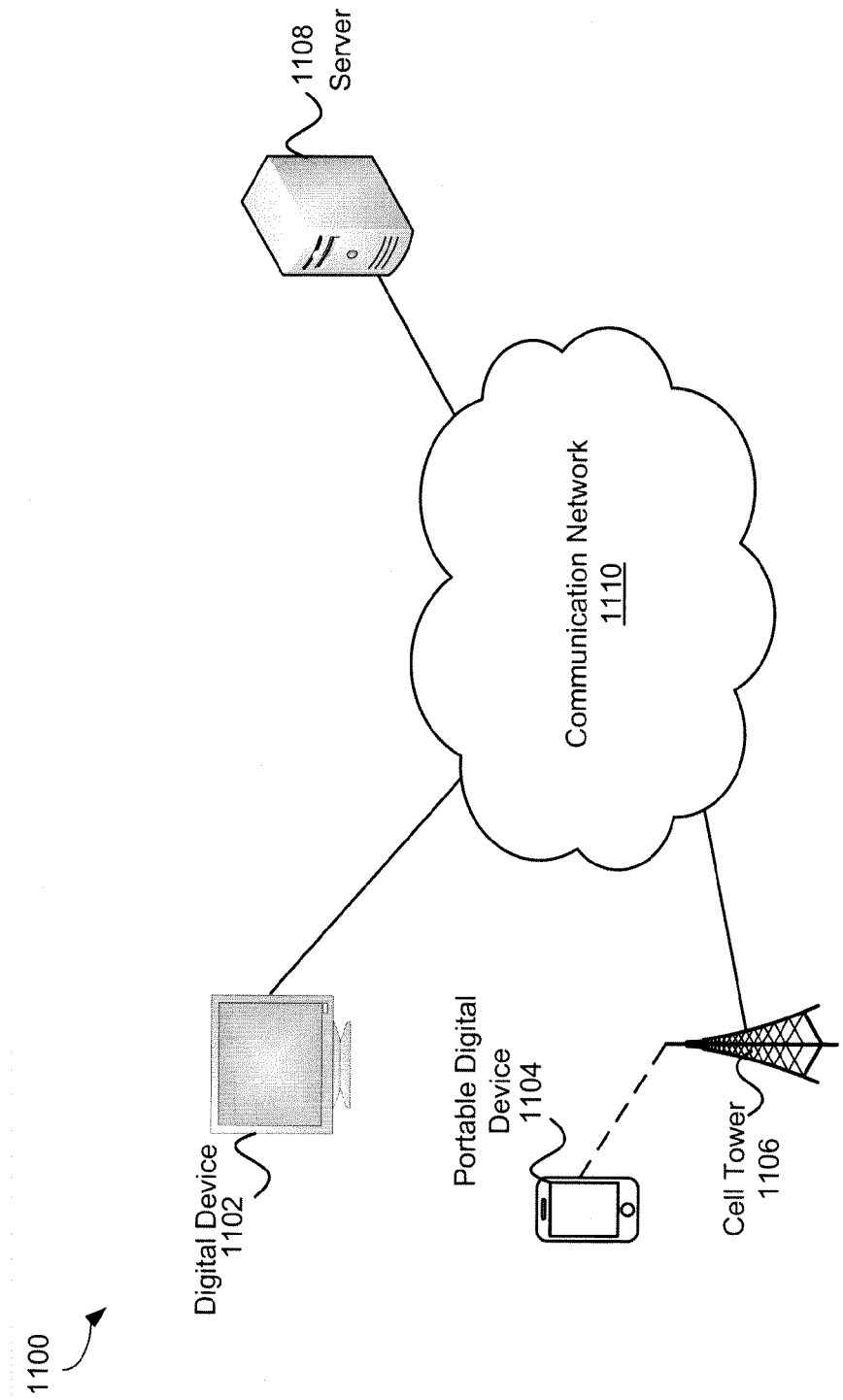
FIG. 11 is a block diagram of an environment for scoring familiarity in some embodiments.

FIG. 11 is a block diagram 1100 of an environment for scoring familiarity in some embodiments. Block diagram 1100 comprises a digital device 1102, a portable digital device 1104, and a server 1108 which communicate via the communication network 1110. The portable digital device 1104 may communicate over the communication network 1110 via a cell tower 1106.

The digital device 1102 and portable digital device 1104 are any digital devices that may play a game that score familiarity with a famous person, celebrity, another player, event, history, geography, timeline, study, or any other category. In various embodiments, one or more players may play over a communication network 1110 such as the Internet. Players may provide player identifiers and play with other players they know or do not know. In some embodiments, the server 1108 selects players. The server 1108 may be a digital device.

In various embodiments, a player may access the server 1108 via the digital device 1102 or the portable digital device 1104. The server 1108 may be a web server. The server 1108 may present the player with a variety of Very Famous People (VFPs) (e.g., celebrities) to choose. When the player selects a VFP, the server may provide the player a list of topics to choose from. Each topic may be associated with the VFP. For example, if a player selects Johnny Depp, the server 1108 may provide a player a list of topics. Each topic may comprise a list of items that have been ranked by Johnny Depp. Mr. Depp may have ranked the items specifically or, in other embodiments, the items may be ranked based on people who know Johnny Depp or public statements/records of Mr. Depp's preferences.

Once the VFP and the topic are chosen, the player may be presented with a list of items to select and/or rank in a manner that is similar to that discussed herein. The player may select and rank the items and indicate when the player is finished. When finished, the server may score the player's selection and ranking of items by comparing the player's rankings to a predetermined ranking associated with the celebrity. In various embodiments, the player may be given a time limit to rank the items. In other embodiments, there is no time limit.

Once the ranking is complete, the server 1108 may score the player's ranking and display the score. Optionally, the server 1108 may compare the player's ranking to other players who have selected the same VFP and topic. The server 1108 may provide a list of players with the highest scores. Similarly, the server 1108 may display a leaderboard displaying the players who have the highest scores over multiple topics with the same VFP and/or over multiple VFPs.

In some embodiments, a player may set up an account with the server 1108. The player may provide a player identifier and/or any personal information to help identify the player. While the player plays the game, topic selections and item selections may be associated with the player. For example, if the player chooses a variety of different celebrities and each time chooses the topic of "wine preferences," the topic "wine preferences" may be associated with the player. Different topics that appear to be associated with the player may be provided in subsequent games. For example, if a player plays multiple games selecting celebrities and "wine preferences," the next time the player plays the game with a group of other players and the player becomes the VIP, the digital device may display "wine preferences" within the list of optional topics for the VIP to choose. Alternatively, the system may suggest topics or items using recommendation algorithms based on the previously played items of the players.

The cell tower 1106 is any device that allows the portable digital device 1104 to wirelessly communicate with the communication network 1110. In one example, the cell tower 1106 allows for data and cellular communication (e.g., 3G, 4G, Wimax, LTE, WiFi, or the like) between the portable digital device 1104 and the communication network 1110.

Although FIG. 11 depicts the portable digital device 1104 in communication with the communication network 1110 via the cell tower 1106, those skilled in the art will appreciate that the portable digital device 1104 may communicate with the communication network 1110 over any network device. A network device may be a hotspot, router, access point, bridge, or any device configured to allow digital devices to communicate over a network. The portable digital device 1104 may communicate with the communication network 1110 over a wire (e.g., Ethernet, DSL, cable, fiber, or telephone line) or wirelessly.

The communication network 1110 may be any network. In one example, the communication network 1110 is the Internet. In some embodiments, the digital device and the server 1108 communicate over the communication network 1110 using IP (e.g., TCP-IP).

Although only one digital device 1102, portable digital device 1104, one cell tower 106, and server 1108 are depicted in FIG. 11, those skilled in the art will appreciate that there may be any number of digital devices 1102, portable digital devices 1104, cell towers 106, and servers 1108.

Those skilled in the art will appreciate that a user (e.g., individual, business, group, or organization) may create their own game by providing topics, items, and/or rankings for others to play. In essence, the user may become a VFP for purposes of the game. Similarly, the user may then select the winner, receive information regarding the players, the players' choices, rankings, and the like. The user may also determine one or more awards (e.g., recognition, virtual badge, letter, email of congratulations, certificate, or identification in a leaderboard) and award the award(s). Those skilled in the art will appreciate that the award may be anything. For example, the award may be a bottle of wine to the player that knows the user best, virtual points, or Facebook credits.

Figure 12:
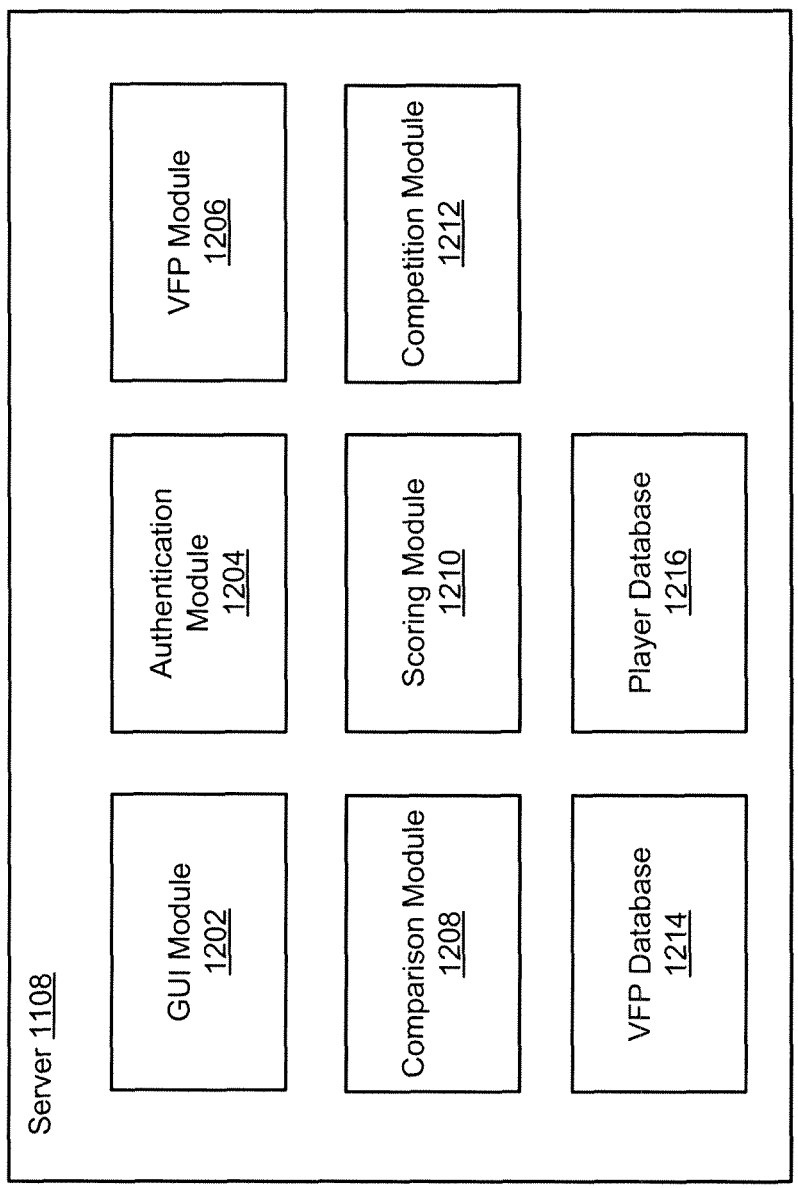
FIG. 12 is a block diagram of a server in some embodiments.

FIG. 12 is a block diagram of a server 1108 in some embodiments. The server 1108 may comprise a GUI module 1202, an authentication module 1204, a VFP module 1206, a comparison module 1208, a scoring module 1210, a competition module 1212, a VFP database 1214, and a player database 1216. The GUI module 1202 may provide an interface (i.e., a graphical user interface) that allows the player to play the game.

The authentication module 1204 may identify and/or authenticate the player. For example, a user of the digital device 1102 may access the server 1108 via the communication network 1110. The GUI module 1202 may provide an interface (e.g., a web page, flash interface, or the like) that may be displayed on the digital device 1102. The authentication module 1204 may authenticate a username (e.g., a player identifier) and/or password of the user. In some embodiments, the user may register with the server 1108. During registration, the user may provide the player identifier, real name, contact information, username, password, preferences, and/or any other information. Once the user accesses the server 1108, the authentication module 1204 may optionally authenticate the user. Once the user is authenticated, the user may play the game as a player.

Once authenticated, the VFP module 1206 may provide the player a list of VFPs. In some embodiments, the VFP module 1206 retrieves a list of VFPs from the VFP database 1214. The player may select a topic and rank items based on what they believe the VFP's ranking of the items would be. In one example, once the VFP is selected, the VFP module 1206 may retrieve topics and/or items associated with the VFP. The player may select a topic and then be presented with a variety of items to rank based on the player's familiarity with the celebrity.

Those skilled in the art will appreciate that the VFP may be any important person, alive or dead, or group of people. In one example, a VFP may be or include any politician, military figure, industrialist, statesman, hero, leader, actor, actress, businessperson, or the like.

Once the player has selected a topic and ranked one or more items, the comparison module 1208 may compare the player's ranking to a predetermined VFP's ranking. In some embodiments, the comparison module 1208 may retrieve the VFP ranking from the VFP database 1214. The comparison module 1208 may compare the player's rankings to the VFP's ranking.

The scoring module 1210 scores the comparison. In some embodiments, the scoring module 1210 scores each item that was selected by the player if the item was also selected by the VFP. The player may receive more points if one or more items were selected and ranked appropriately based on the comparison with the VFP ranking.

The scoring module 1210 may score the player and display the score. In various embodiments, the player may choose multiple topics associated with a single VFP. The scoring module 1210 may score each ranking and store the scores associated with the player in the player database 1216. The scoring module 1210 may also aggregate the ranking. The GUI module 1202, in some embodiments, may display a list of players in order of those with the highest scores for a single topic or multiple topics associated with a VFP. Further, the GUI module 1202 may display the players (i.e., a leaderboard) who score highly across any number of VFPs.

The competition module 1212 may allow for competition between players. In one example, multiple players may select the same topic associated with the same VFP and rank two or more items based on their familiarity with the VFP. The player that scores highest may receive a coupon, badge, exclusive media (e.g., picture, icon, video, or audio), or any other award.

In various embodiments, the competition module 1212 may allow players to enter contests. Each contest may test how familiar a player is with one or more VFPs. The competition module 1212 may hold the contest over a predetermined period of time (e.g., the player attempts to correctly rank as many items from as many topics as possible before a time limit).

The VFP database 1214 may store information concerning VFPs, including preferences, topics associated with the celebrities, and ranked items. The player database 1216 may comprise registration information, authentication information, player identification information, player identifiers, usernames, and/or passwords. The player database 1216 may also store the scores associated with the player, as well as past topics selected, items selected, rankings of items, celebrities chosen, and the like.

Although the VFP database 1214 and player database 1216 are identified as databases, those skilled in the art will appreciate that the VFP database 1214 and the player database 1216 may be any data structure.

Those skilled in the art will appreciate that the modules depicted in FIG. 12 are exemplary. The server 1108 may comprise more or less modules than those depicted. For example, one or more modules of the server 1108 may perform all or a portion of the functions of any other module.

Those skilled in the art will appreciate that any number of topics, each with any number of items, may be provided to the players (e.g., the VIP or VFP).

In various embodiments, a player may create a topic and items. For example, a user (e.g., business, VFP, or another player) may create a topic and identify items for one or more other players to play. The created topics and/or items may be available for play over a network or the topic and/or items may be downloaded to a digital device. In some embodiments, the user who created the topic and/or items, may also create an award. The award may be an item, information (e.g., about a famous person, group, or landmark), or a leaderboard. The user who created the topic and/or items, may also determine the winner and the player who receives the award based on scoring and/or any other information.

Figure 13:
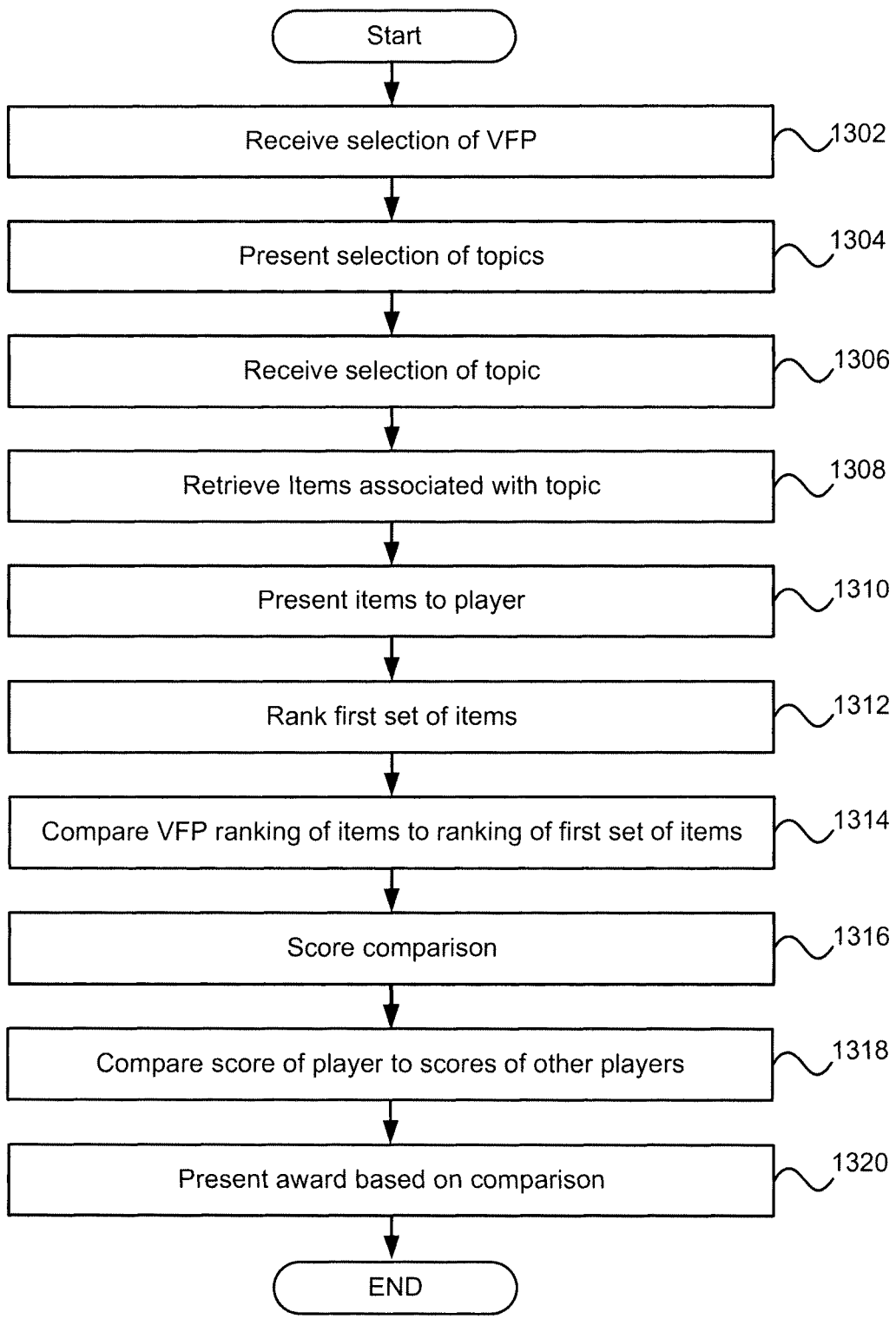
FIG. 13 is a method for scoring familiarity with a celebrity in some embodiments.

FIG. 13 is a flowchart depicting a method for scoring familiarity with a VFP in some embodiments. In step 1302, the VFP module 1206 receives a selection of a VFP. In one example, the GUI module 1202 displays a web page with a selection of celebrities (e.g., a scrollable list). The player (e.g., user of the portable display device 1104) may select a celebrity from the list. In one example, the player may select a celebrity from he list by clicking on or otherwise identifying a celebrity from the list of celebrities.

In step 1304, the VFP module 1206 presents the player with a selection of topics. The topics may include featured topics. In some embodiments, the VFP module 1206 retrieves a list of available topics from the VFP database 1214. The selection of topics may comprise a list of topics associated with the VFP.

In step 1306, the VFP module 1206 may receive the selection of the topic from the player. In step 1308, the VFP module 1206 may retrieve items associated with the topic. The list of items may include any number of items.

In step 1310, the list of items is presented to the player. In various embodiments, the GUI module 1202 depicts a scrollable list or table of items. In some embodiments, the items appear scattered on a web page.

In step 1312, the player may rank one or more of the items. In one example, the player may select a set of items from a larger number of items (i.e., a subset) and then rank the selected items. For example, the list of items may include ten different items and the player selects five of the items to rank. The player may rank the items in order by selecting and designating the item at a position. For example, the player may click (i.e., select) and drag a representation of the item onto a list to rank the item.

In step 1314, once the player has completed ranking the items, the comparison module 1208 may compare a celebrity ranking of items to the ranking of the set of items by the player. For example, the VFP module 1206 may retrieve a celebrity ranking of items from the VFP database 1214 when a player selects the celebrity and topic. The VFP module 1206 may also provide the items in the celebrity ranking as well as additional items in the list of items that are presented to the player. When the player has completed selecting and ranking a set of items, the comparison module 1208 may compare the player's rankings to the celebrity ranking.

In step 1316, the scoring module 1210 scores the player ranking based on the comparison with the celebrity ranking. In step 1318, the competition module 1212 may compare the score of the player to other scores of other players who selected the same celebrity and/or topic.

In step 1320, the competition module 1212 may present an award to the player with the highest score. In various embodiments, the award may comprise a virtual badge, trophy, or other media. The competition module 1212 may also depict a leaderboard which identifies the players with the highest scores (e.g., for the celebrity, for the topic, overall score, or the like). In other embodiments, the award is controlled by the VFP, with the selection of the winner from the set of possible contests using an algorithm controlled by the VFP.

In one example, any number of people play a game regarding a particular VFP. The VFP (or representatives of the VFP) may identify one or more players (e.g., the highest scoring players) and provide awards or other recognition. In some embodiments, the VFP may randomly select a winner in the case of a tie and determine the winner on any other criteria.

In various embodiments, players may register for notifications about games and/or contest updates. For example, a player may register with the server 1108 (e.g., via the authentication module 1204) and request updates when games become available for preferred topics, VFPs, events, or the like. Similarly, the player may receive notifications (e.g., SMS, email, or social network site communication) indicating if the player won a contest, upcoming events, friends who are playing games, and the like. In some embodiments, a player may identify preferences including interests or demographic data. The GUI module 1202 and/or the competition module 1212 may notify the player if contests and/or games associated with the player's interests are available.

Figure 14:
FIG. 14 is an exemplary display for selecting a famous person in some embodiments.

FIG. 14 is an exemplary display for selecting a famous person in some embodiments. In various embodiments, the exemplary display depicts a number of famous people. In one example, the display depicts various famous person identifiers which may comprise a name, icon, image, audio, video, or any other kind of identifier. The player may select a famous person by selecting the famous person identifier. In this example, the player has chosen Charlie Sheen.

Figure 15:
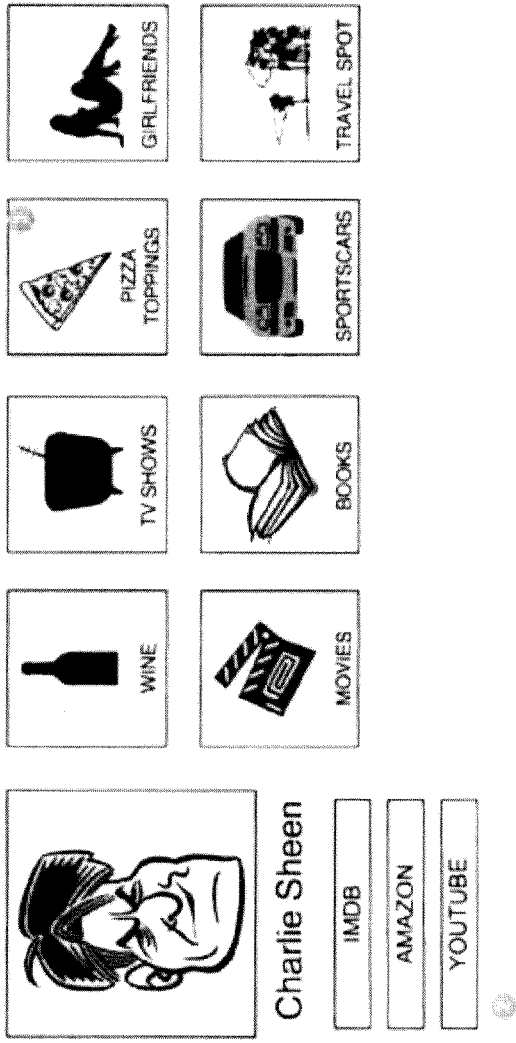
FIG. 15 is an exemplary display depicting topics associated with the famous person to select in some embodiments.

FIG. 15 is an exemplary display depicting topics associated with the famous person to select in some embodiments. In various embodiments, the GUI module 1202 depicts a variety of topics that are associated with Charlie Sheen. For example, available topics include, but are not limited to, wine, television shows, pizza toppings, girlfriend, movies, books, sports cars, and travel spots. The display also may include links to different websites for the player to get more information about Charlie Sheen (e.g., videos of Charlie Sheen from YouTube, information about Charlie Sheen form IMDB, or DVDs including Charlie Sheen from Amazon.com).

In this example, the player selected pizza toppings. Subsequently, in some embodiments, the VFP module 1206 may retrieve a predetermined ranking of pizza toppings preferred by Charlie Sheen from the VFP database.

Figure 16:
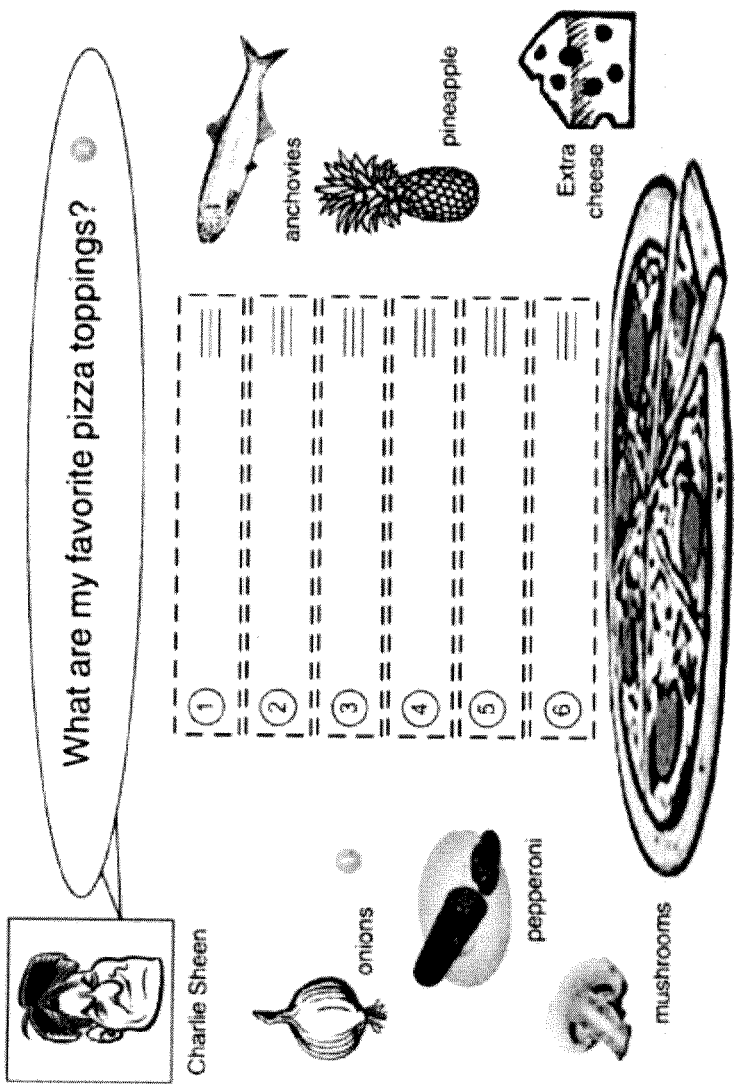
FIG. 16 is an exemplary display for ranking items associated with the topic of the famous person in some embodiments.

FIG. 16 is an exemplary display for ranking items associated with the topic of the famous person in some embodiments. Display depicts a number of pizza toppings as items and an empty ordered list. The pizza toppings items in display include onions, pepperoni, mushrooms, anchovies, pineapple, and extra cheese. The player may select an item (e.g., pepperoni) and drag the item to a position in the ordered list. The player may also select an item in the list and change the position of the item (i.e., higher or lower on the list).

In this example, the number of available items is equal to the number of items to be selected and ranked. In some embodiments, there may be any number of items (e.g., 20 pizza toppings) and any number of items to be selected and ranked (e.g., the ordered list only allows for four items to be ranked).

Figure 17:
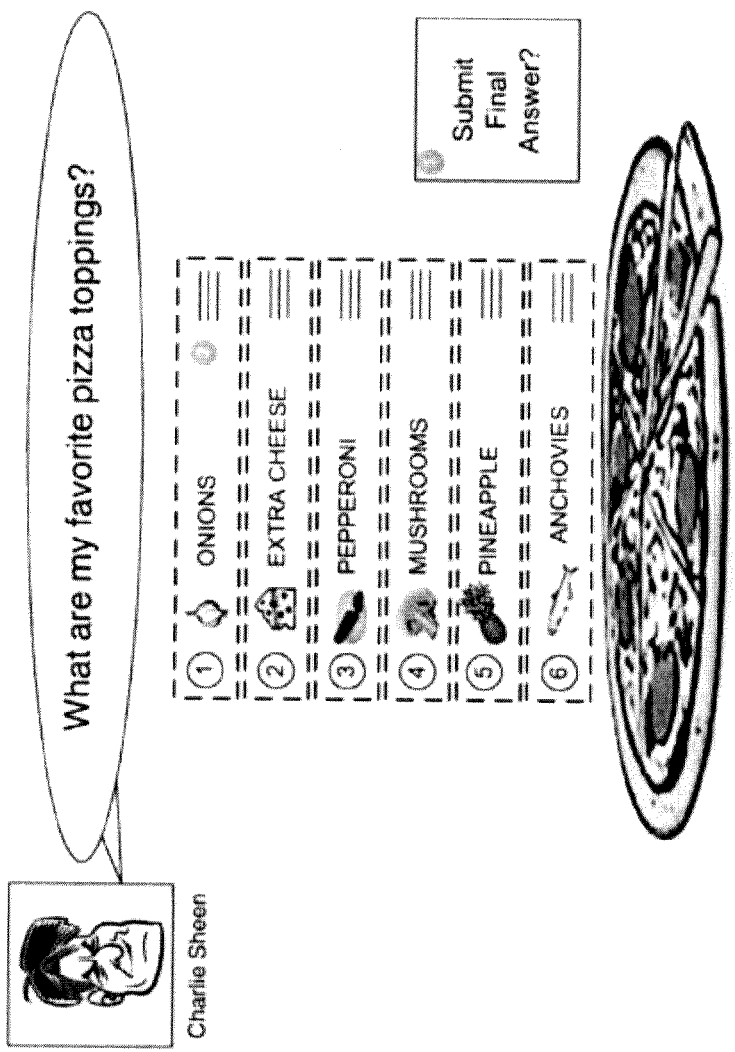
FIG. 17 is an exemplary display for confirming a ranking of the items associated with the topic of the famous person in some embodiments.

FIG. 17 is an exemplary display for confirming a ranking, of the items associated with the topic of the famous person in some embodiments. Once the ordered list of items is completed and the items are ranked, the player may indicate that they have finished ranking the items. The player may activate a button with the text "Submit Final Answer?" In this example, the player has ranked the items in order of Charlie Sheen's pizza topping preferences which includes onions, extra cheese, pepperoni, mushrooms, pineapple, and anchovies.

Figure 18:
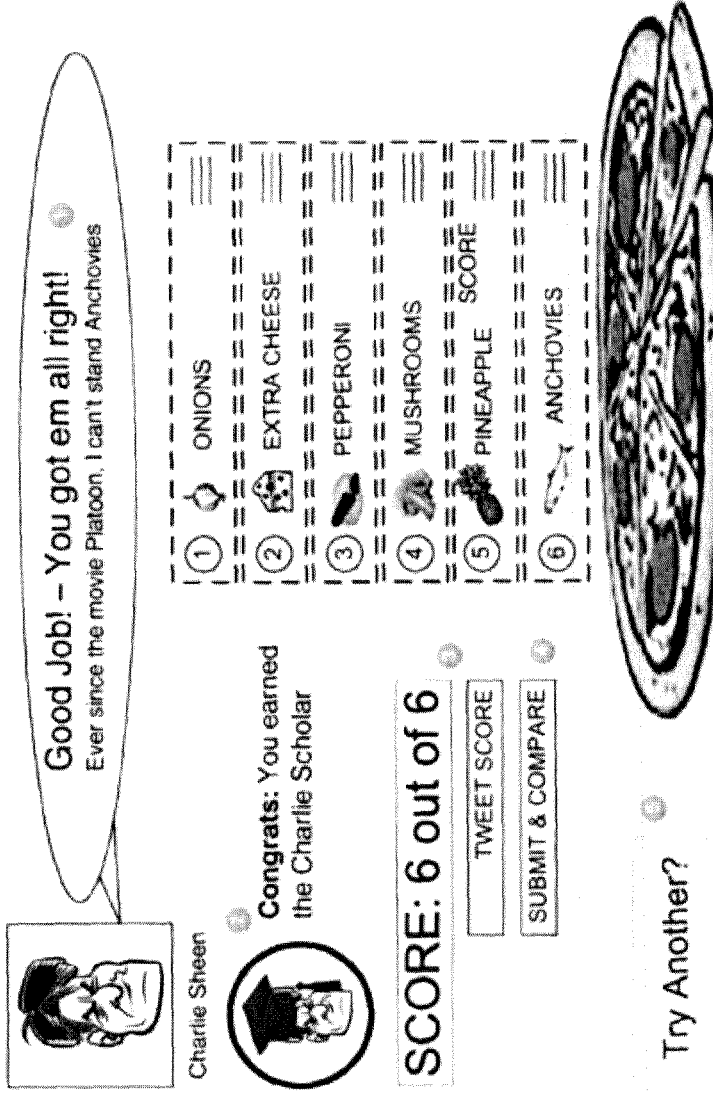
FIG. 18 is an exemplary display for scoring the ranking of the items associated with the topic of the famous person in some embodiments.

FIG. 18 is an exemplary display for scoring the ranking of the items associated with the topic of the famous person in some embodiments. In various embodiments, once the player indicates that they have completed ranking, the scoring module 1210 may score the player's ranking by comparing the player's ranking to the famous person's ranking.

As depicted in display, the player's ranking is the same as the famous person's ranking and so may get a perfect score. In some embodiments, the scoring module 1210 and/or the competition module 1212 may provide a badge or other aware to the player for getting all of the items ranked correctly. The display may also allow the player to broadcast their achievement, scores, or information about the famous person over a social network such as Twitter, Facebook, MySpace, or the like. The display may also display a factoid or other information about the famous person.

Further, the display 1800 may also give the player an option to play again. In some embodiments, the display 1800 directs the player to a display for choosing another VFP. In other embodiments, the display 1800 may direct the player to a display for choosing another topic for the previously chosen famous person.

Figure 19:
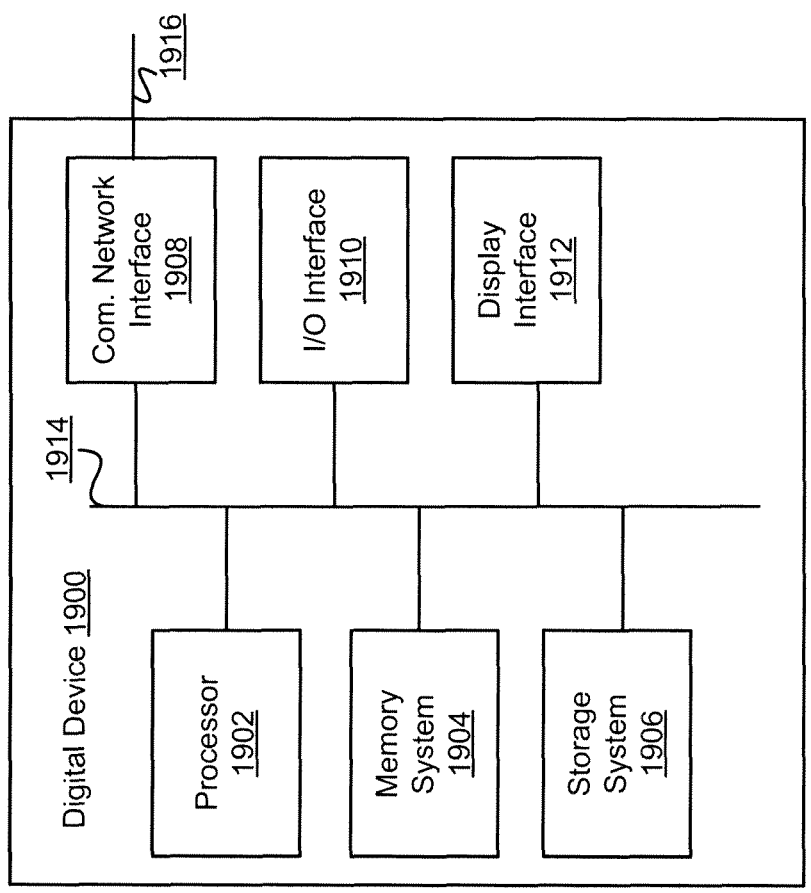
FIG. 19 is a block diagram of an exemplary digital device in some embodiments.

FIG. 19 is a block diagram of an exemplary digital device 1900. The digital device 1900 comprises a processor 1902, a memory system 1904, a storage system 1906, a communication network interface 1908, an I/O interface 1910, and a display interface 1912 communicatively coupled to a bus 1914. The processor 1902 is configured to execute executable instructions (e.g., programs). In some embodiments, the processor 1902 comprises circuitry or any processor capable of processing the executable instructions.

The memory system 1904 is any memory configured to store data. Some examples of the memory system 1904 are storage devices, such as RAM or ROM. The memory system 1904 can comprise the ram cache. In various embodiments, data is stored within the memory system 1904. The data within the memory system 1904 may be cleared or ultimately transferred to the storage system 1906.

The storage system 1906 is any storage configured to retrieve and store data. Some examples of the storage system 1906 are flash drives, hard drives, optical drives, and/or magnetic tape. In some embodiments, the digital device 1900 includes a memory system 1904 in the form of RAM and a storage system 1906 in the form of flash data. Both the memory system 1904 and the storage system 1906 comprise computer readable media which may store instructions or programs that are executable by a computer processor including the processor 1902.

The communication network interface (com. network interface) 1908 can be coupled to a network (e.g., communication network 114) via the link 1916. The communication network interface 1908 may support communication over an Ethernet connection, a serial connection, a parallel connection, or an ATA connection, for example. The communication network interface 1908 may also support wireless communication (e.g., 802.11 a/b/g/n, WiMax). It will be apparent to those skilled in the art that the communication network interface 1908 can support many wired and wireless standards.

The optional input/output (I/O) interface 1910 is any device that receives input from the user and output data. The optional display interface 1912 is any device that is configured to output graphics and data to a display. In one example, the display interface 1912 is a graphics adapter. It will be appreciated that not all digital devices 1900 comprise either the I/O interface 1910 or the display interface 1912.

It will be appreciated by those skilled in the art that the hardware elements of the digital device 1900 are not limited to those depicted in FIG. 19. A digital device 1900 may comprise more or less hardware elements than those depicted. Further, hardware elements may share functionality and still be within various embodiments described herein. In one example, encoding and/or decoding may be performed by the processor 1902 and/or a co-processor located on a GPU (i.e., Nvidia).

The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

The invention claimed is:

1. A system for scoring a comparison of ranked items associated with a topic selected by a first user, comprising:
   a processor;
   a topic module configured to cooperate with the processor to retrieve, over a communication network, one or more potential topics based on information stored in a social data repository of a first user, and receive a topic selection from the first user, the topic selection identifying a topic selected by the first user from the one or more potential topics;
   a GUI module configured to cooperate with the processor to present items associated with the topic to the first user to enable the first user to input a first ranking of a first set of the items according to a subjective preference of the first user and present the items to (i) a second user to enable the second user to input a second ranking of a second set of the items, and (ii) a third user to enable the third user to input a third ranking of the second set of the items;
   a ranking module configured to cooperate with the processor to receive (i) the first ranking of the first set of the items by the first user, (ii) the second ranking of the second set of the items by the second user, and (iii) the third ranking of the second set of the items by the third user; and
   a scoring module configured to cooperate with the processor to determine a first game score based on a comparison of the second ranking relative to the first ranking, and a second game score based on a comparison of the third ranking relative to the first ranking, the scoring module further configured to present an award based, at least in part, on a comparison of the first game score and the second game score.

2. The system of claim 1, wherein the second set of items comprises the same items as the first set of items.

3. The system of claim 1, wherein an order of the items presented to the second user is not related to the first ranking of the first set of items.

4. The system of claim 1, wherein the scoring module is further configured to receive an award determination from the first user as well as a selection of the second user by the first user.

5. The system of claim 1, wherein the topic module is further configured to select one or more topics to present to the first user based on a previously selected topic by the first user.

6. The system of claim 1, wherein the GUI module is further configured to:
receive item identification from the first user, the item identification identifying identified items; and
display the identified items to the first user.

7. The system of claim 1, wherein the second ranking received from the second user is based on what the second user guesses other users will rank the second set of items.

8. The system of claim 1, wherein the first set of items includes all of the items presented to the first user.

9. The system of claim 1, wherein the award includes a number of points based on the comparison.

10. The system of claim 1, further comprising an item module configured to receive one or more items from the first user, wherein the one or more items received from the first user are subsequently presented by the GUI module.

11. The system of claim 1, wherein the scoring module is further configured to display a leaderboard, the leaderboard displaying an identifier and score associated with the second user as well as an identifier and score associated with the third user.

12. The system of claim 1, wherein the topic selection from the first user comprises a topic associated with a celebrity.

13. The system of claim 1, wherein the scoring module is further configured to compare the first ranking and the second ranking to a predetermined ranking and score the first ranking and the second ranking based on the comparison.

14. A method for scoring a comparison of ranked items associated with a topic selected by a first user, comprising:
retrieving, by a computer processor over a communication network, one or more potential topics based on information stored in a social data repository of a first user;
receiving, by the computer processor, from the first user, a selection identifying a topic from the one or more potential topics;
presenting, by the computer processor, items associated with the topic to the first user to enable the first user to input a first ranking of a first set of items according to a subjective preference of the first user;
presenting, by the computer processor, the items associated with the topic to a second user to enable the second user to input a second ranking of a second set of the items;
presenting, by the computer processor, the items associated with the topic to a third user to enable the third user to input a third ranking of the second set of the items;
receiving, by the computer processor, the first ranking of the first set of the items by the first user;
receiving, by the computer processor, the second ranking of the second set of the items by the second user;
receiving, by the computer processor, the third ranking of the second set of the items by the second user;
generating, by the computer processor, a first game score based on a comparison of the second ranking relative to the first ranking;
generating, by the computer processor, a second game score based on a comparison of the third ranking relative to the first ranking; and
presenting an award based, at least in part, on a comparison of the first game score and the second game score.

15. The method of claim 14, wherein the second set of items comprises the same items as the first set of items.

16. The method of claim 14, wherein an order of the items presented to the second user is not related to the first ranking of the first set of items.

17. The method of claim 14, further comprising determining, by the first user, the award and presenting the award.

18. The method of claim 14, further comprising selecting a topic to present to the first user for selection based on a previously selected topic by the first user.

19. The method of claim 14, further comprising:
receiving, from the first user, selections identifying identified items associated with the topic; and
displaying the identified items to the first user.

20. The method of claim 14, wherein the second ranking of the second set of items by the second user is based on what the second user guesses other users will rank the second set of items.

21. The method of claim 14, wherein the first set of items includes all of the items presented to the first user.

22. The method of claim 14, wherein the generating the first game score comprises comparing the second ranking to the first ranking and providing points based on the comparison.

23. The method of claim 14, further comprising displaying a leaderboard, the leaderboard displaying an identifier and score associated with the second user as well as an identifier and score associated with the third user.

24. The method of claim 14, wherein the topic received from the first user is associated with a celebrity.

25. The method of claim 14, wherein the generating the first game score comprises comparing the first ranking and the second ranking to a predetermined ranking and scoring the first ranking and the second ranking based on the comparison.

26. A non-transitory computer-readable medium comprising executable instructions, the instructions being executable by a processor to perform a method for scoring a comparison of ranked items associated with a topic selected by a first user, the method comprising:
retrieving, by a computer processor over a communication network, one or more potential topics based on information stored in a social data repository of a first user;
receiving, from the first user, a selection identifying a topic from the one or more potential topics;
presenting items associated with the topic to the first user to enable the first user to input a first ranking of a first set of items according to a subjective preference of the first user;
presenting the items associated with the topic to a second user to enable the second user to input a second ranking of a second set of the items;
presenting the items associated with the topic to a third user to enable the third user to input a third ranking of the second set of the items;
receiving the first ranking of the first set of the items by the first user;
receiving the second ranking of the second set of the items by the second user;
receiving the third ranking of the second set of the items by the second user;

generating a first game score based on a comparison of the second ranking relative to the first ranking;
generating a second game score based on a comparison of the third ranking relative to the first ranking; and
presenting an award based, at least in part, on a comparison of the first game score and the second game score.

\* \* \* \* \*